US012681499B2

(12) United States Patent (10) Patent No.: US 12,681,499 B2

Shin et al. (45) Date of Patent: Jul. 14, 2026

(54) MOBILE ROBOT AND METHOD FOR CONTROLLING MOBILE ROBOT

(71) Applicant: Samsung Electronics Co., Ltd., Suwon-si (KR)

(72) Inventors: Kyoungha Shin, Suwon-si (KR); Hyelim Park, Suwon-si (KR); Kangjun Seo, Suwon-si (KR); Soohyun Sung, Suwon-si (KR); Jonghyun Son, Suwon-si (KR); Myoungsoo Jang, Suwon-si (KR); Chihong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 71 days.

(21) Appl. No.: 18/582,054

(22) Filed: Feb. 20, 2024

(65) Prior Publication Data

US 2024/0345596 A1 Oct. 17, 2024

Related U.S. Application Data

(63) Continuation of application No. PCT/KR2024/001706, filed on Feb. 6, 2024.

(30) Foreign Application Priority Data

Apr. 17, 2023 (KR) ........................ 10-2023-0050338
Jul. 7, 2023 (KR) ........................ 10-2023-0088687

(51) Int. Cl.
*G05D 1/622* (2024.01)

(52) U.S. Cl.
CPC .................................... *G05D 1/637* (2024.01)

(58) Field of Classification Search
None
See application file for complete search history.

(56) References Cited

U.S. PATENT DOCUMENTS

| 10,688,652 | B2 | 6/2020 | Hummel |
| 10,884,421 | B2 | 1/2021 | Brede et al. |
| 10,915,107 | B2 | 2/2021 | Brede et al. |
| 10,921,806 | B2 | 2/2021 | Kim et al. |
| 11,194,338 | B2 | 12/2021 | Chae et al. |

(Continued)

FOREIGN PATENT DOCUMENTS

| JP | 2007-183032 A | 7/2007 |
| JP | 2019-034136 A | 3/2019 |

(Continued)

OTHER PUBLICATIONS

International Search Report dated May 23, 2024, issued in International Patent Application No. PCT/KR2024/001706.

*Primary Examiner* — Jason Holloway
*Assistant Examiner* — Christopher A Buksa
(74) *Attorney, Agent, or Firm* — Jefferson IP Law, LLP

(57) ABSTRACT

A mobile robot is provided. The mobile robot includes a communication circuitry configured to communicate with at least one of a user device or a server, a sensor configured to collect environmental information of an indoor space, and a controller configured to be electrically connected to the sensor and the communication circuitry. The controller is configured to: store the environmental information of each of a plurality of zones of the indoor space obtained by the sensor, set a purpose of a first zone of the plurality of zones, based on a user input or the environmental information of each of the plurality of zones, and generate information recommending a target device to be placed in the first zone, based on environmental information of the first zone and required environmental information corresponding to the set purpose.

15 Claims, 19 Drawing Sheets

(56)        References Cited

U.S. PATENT DOCUMENTS

| | | | |
|---|---|---|---|
| 11,307,593 | B2 | 4/2022 | Kim et al. |
| 11,556,125 | B2 | 1/2023 | Jones et al. |
| 2018/0021942 | A1* | 1/2018 | Hummel ............... A47L 9/2852 |
| | | | 700/253 |
| 2018/0074508 | A1 | 3/2018 | Kleiner et al. |
| 2019/0369628 | A1* | 12/2019 | Kim ..................... G05D 1/0219 |
| 2020/0025401 | A1 | 1/2020 | Cheon et al. |
| 2021/0161351 | A1 | 6/2021 | Lee et al. |
| 2022/0022716 | A1 | 1/2022 | Wu et al. |
| 2022/0280007 | A1 | 9/2022 | Jang |
| 2022/0378269 | A1 | 12/2022 | Kim |

FOREIGN PATENT DOCUMENTS

| | | | |
|---|---|---|---|
| JP | 2019-034138 | A | 3/2019 |
| JP | 2020-086678 | A | 6/2020 |
| JP | 2021-535485 | A | 12/2021 |
| KP | 10-2210443 | B1 | 2/2021 |
| KR | 10-2012-0114671 | A | 10/2012 |
| KR | 10-1659037 | B1 | 9/2016 |
| KR | 10-2018-0084305 | A | 7/2018 |
| KR | 10-2019-0093529 | A | 8/2019 |
| KR | 10-2019-0101924 | A | 9/2019 |
| KR | 10-2207714 | B1 | 1/2021 |
| KR | 10-2021-0069466 | A | 6/2021 |
| KR | 10-2269362 | B1 | 6/2021 |
| KR | 10-2286137 | B1 | 8/2021 |
| KR | 10-2021-0007360 | A | 12/2021 |
| KR | 10-2021-0151113 | A | 12/2021 |
| KR | 10-2022-0159629 | A | 12/2022 |
| WO | 2019-136019 | A1 | 7/2019 |
| WO | 2020-041817 | A1 | 3/2020 |

* cited by examiner

Room1

Room2

A1

A2

Room4

Room5

A4

Room3

A1

A2

A1

SUITABILITY BETWEEN SELECTED
PURPOSE AND EACH ROOM
IS INDICATED AS SCORE.

FIG. 16

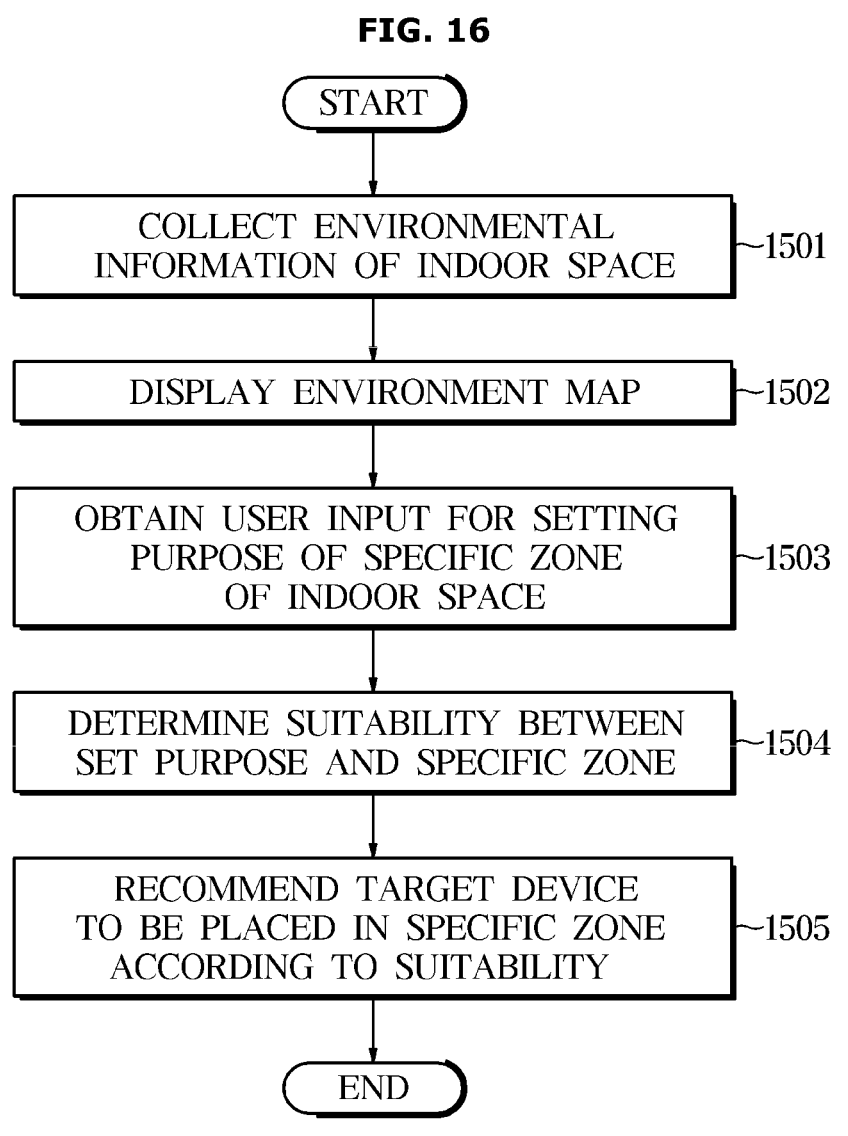

START

COLLECT ENVIRONMENTAL
INFORMATION OF INDOOR SPACE ~1501

DISPLAY ENVIRONMENT MAP ~1502

OBTAIN USER INPUT FOR SETTING
PURPOSE OF SPECIFIC ZONE
OF INDOOR SPACE ~1503

DETERMINE SUITABILITY BETWEEN
SET PURPOSE AND SPECIFIC ZONE ~1504

RECOMMEND TARGET DEVICE
TO BE PLACED IN SPECIFIC ZONE
ACCORDING TO SUITABILITY ~1505

END

FIG. 17

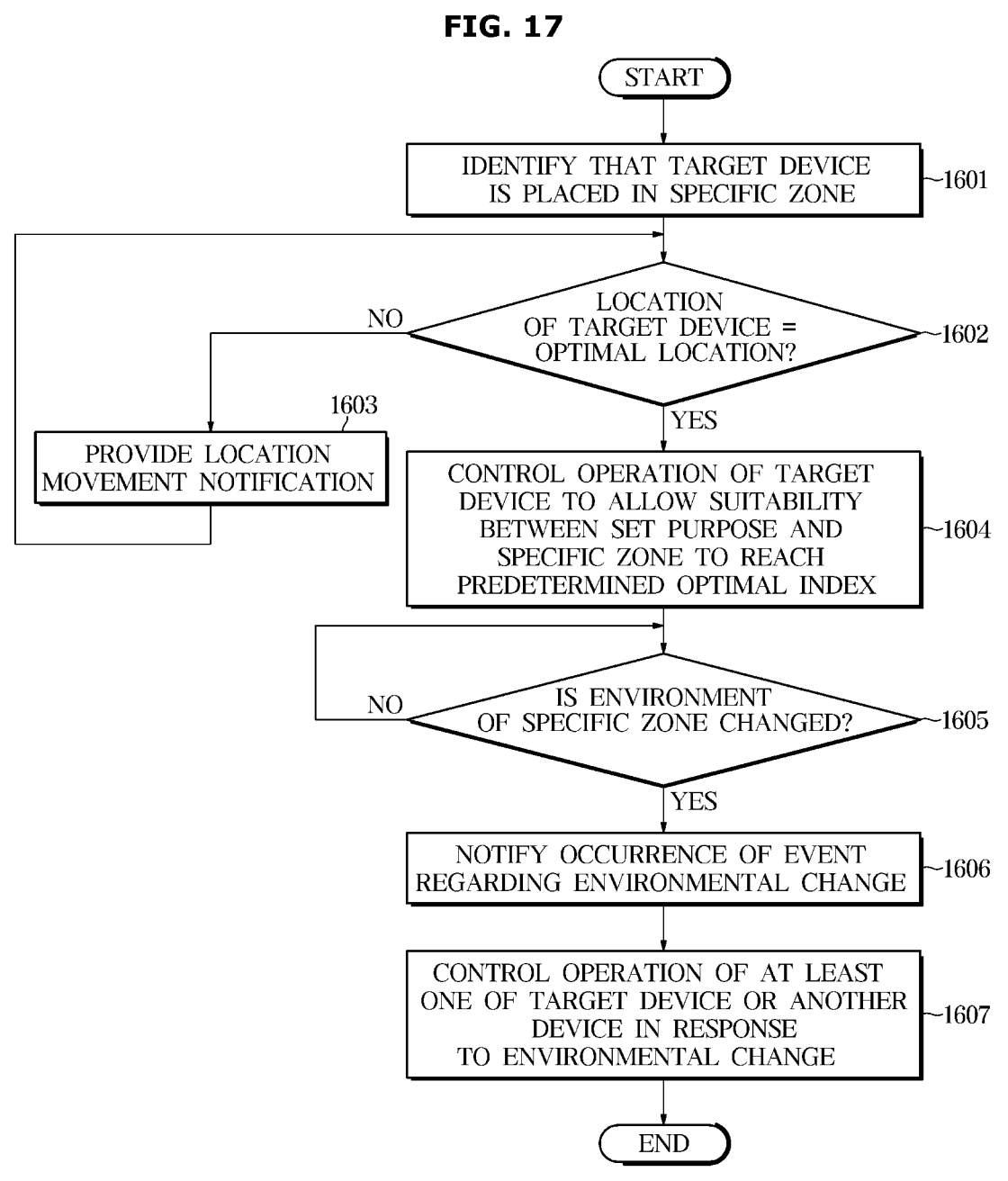

START

IDENTIFY THAT TARGET DEVICE
IS PLACED IN SPECIFIC ZONE —1601

LOCATION
OF TARGET DEVICE =
OPTIMAL LOCATION? —1602

NO

YES

1603

PROVIDE LOCATION
MOVEMENT NOTIFICATION

CONTROL OPERATION OF TARGET
DEVICE TO ALLOW SUITABILITY
BETWEEN SET PURPOSE AND
SPECIFIC ZONE TO REACH
PREDETERMINED OPTIMAL INDEX —1604

IS ENVIRONMENT
OF SPECIFIC ZONE CHANGED? —1605

NO

YES

NOTIFY OCCURRENCE OF EVENT
REGARDING ENVIRONMENTAL CHANGE —1606

CONTROL OPERATION OF AT LEAST
ONE OF TARGET DEVICE OR ANOTHER
DEVICE IN RESPONSE
TO ENVIRONMENTAL CHANGE —1607

END

FIG. 19

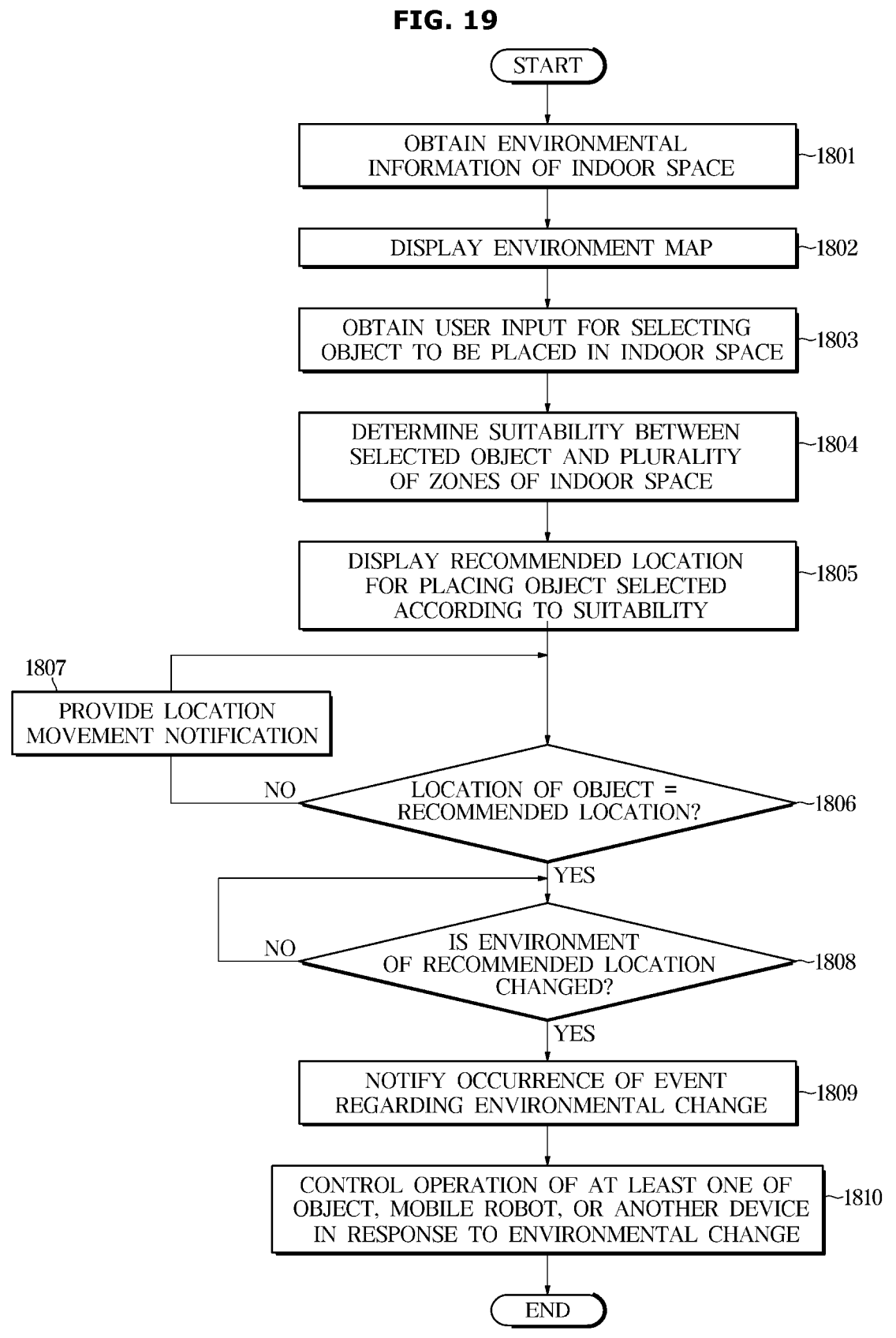

```
                    ( START )
                        │
                        ▼
        ┌───────────────────────────────┐
        │   OBTAIN ENVIRONMENTAL        │
        │ INFORMATION OF INDOOR SPACE   │──1801
        └───────────────────────────────┘
                        │
                        ▼
        ┌───────────────────────────────┐
        │   DISPLAY ENVIRONMENT MAP     │──1802
        └───────────────────────────────┘
                        │
                        ▼
        ┌───────────────────────────────┐
        │  OBTAIN USER INPUT FOR SELECTING  │
        │ OBJECT TO BE PLACED IN INDOOR SPACE │──1803
        └───────────────────────────────┘
                        │
                        ▼
        ┌───────────────────────────────┐
        │  DETERMINE SUITABILITY BETWEEN │
        │  SELECTED OBJECT AND PLURALITY │──1804
        │    OF ZONES OF INDOOR SPACE    │
        └───────────────────────────────┘
                        │
                        ▼
        ┌───────────────────────────────┐
        │  DISPLAY RECOMMENDED LOCATION  │
        │   FOR PLACING OBJECT SELECTED  │──1805
        │    ACCORDING TO SUITABILITY    │
        └───────────────────────────────┘
                        │
    1807                │
 ┌──────────────────┐   │
 │ PROVIDE LOCATION │   │
 │MOVEMENT NOTIFICATION│ │
 └──────────────────┘   │
          │             ▼
          │  NO  ╱─────────────────────╲
          └─────┤  LOCATION OF OBJECT =  │──1806
                ╲  RECOMMENDED LOCATION? ╱
                 ╲─────────────────────╱
                        │ YES
                        ▼
          NO  ╱─────────────────────╲
        ┌─────┤   IS ENVIRONMENT      │──1808
        │     ╲ OF RECOMMENDED LOCATION╱
        │      ╲     CHANGED?         ╱
        │       ╲───────────────────╱
        │              │ YES
        │              ▼
        │     ┌───────────────────────────────┐
        │     │   NOTIFY OCCURRENCE OF EVENT   │──1809
        │     │ REGARDING ENVIRONMENTAL CHANGE │
        │     └───────────────────────────────┘
        │              │
        │              ▼
        │     ┌───────────────────────────────┐
        │     │ CONTROL OPERATION OF AT LEAST ONE OF │
        │     │OBJECT, MOBILE ROBOT, OR ANOTHER DEVICE│──1810
        │     │ IN RESPONSE TO ENVIRONMENTAL CHANGE │
        │     └───────────────────────────────┘
        │              │
        │              ▼
        │          ( END )
```

MOBILE ROBOT AND METHOD FOR CONTROLLING MOBILE ROBOT

CROSS-REFERENCE TO RELATED APPLICATION(S)

This application is a continuation application, claiming priority under § 365 (c), of an International application No. PCT/KR2024/001706, filed on Feb. 6, 2024, which is based on and claims the benefit of a Korean patent application number 10-2023-0050338, filed on Apr. 17, 2023, in the Korean Intellectual Property Office, and of a Korean patent application number 10-2023-0088687, filed on Jul. 7, 2023, in the Korean Intellectual Property Office, the disclosure of each of which is incorporated by reference herein in its entirety.

TECHNICAL FIELD

The disclosure relates to a mobile robot capable of autonomous driving, and a method for controlling the mobile robot.

BACKGROUND ART

Robots have been developed for industrial purposes and have been a part of factory automation. Recently, the application of robots has expanded to include medical robots, aerospace robots, service robots, and the like, and domestic robots for use at home are also being produced. Among the robots, robots capable of autonomously driving are referred to as mobile robots.

A representative example of a mobile robot is a cleaning robot (robot cleaner) that cleans an indoor space. The mobile robot may move through an indoor space, identify objects located in the indoor space, and generate a map of the indoor space. The mobile robot may use the map of the indoor space to clean the indoor space. The mobile robot may collect environmental information of the indoor space.

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly an aspect of the disclosure is to provide a mobile robot and a method for controlling the mobile robot which provides an evaluation of an environment of each of a plurality of zones of an indoor space, based on environmental information of the plurality of zones collected while traveling in the indoor space.

Another aspect of the disclosure is to provide a mobile robot and a method for controlling the mobile robot which recommends an electronic device required to use a specific zone of an indoor space for a user's desired purpose based on environmental information of the indoor space.

Another aspect of the disclosure is to provide a mobile robot and a method for controlling the mobile robot which recommends a suitable location for an object that a user desires to place in an indoor space based on environmental information of the indoor space.

Additional aspects will be set forth in part in the description which follows and, in part, will be apparent from the description, or may be learned by practice of the presented embodiments.

In accordance with an aspect of the disclosure, a mobile robot is provided. The mobile robot includes a communication circuitry configured to communicate with at least one of a user device or a server, a sensor configured to collect environmental information of an indoor space, and a controller configured to be electrically connected to the sensor and the communication circuitry. The controller is configured to: store the environmental information of each of a plurality of zones of the indoor space obtained by the sensor, set a purpose of a first zone of the plurality of zones, based on a user input or the environmental information of each of the plurality of zones, and generate information recommending a target device to be placed in the first zone, based on environmental information of the first zone and required environmental information corresponding to the purpose.

In accordance with another aspect of the disclosure, a method for controlling a mobile robot is provided. The method includes collecting, by a sensor, environmental information of each of a plurality of zones of an indoor space, setting a purpose of a first zone of the plurality of zones, based on a user input or the environmental information of each of the plurality of zones, and generating information recommending a target device to be placed in the first zone, based on environmental information of the first zone and required environmental information corresponding to the set purpose.

The mobile robot and the method for controlling the mobile robot provides an evaluation of an environment of each of a plurality of zones of an indoor space based on environmental information of the plurality of zones collected while traveling in the indoor space, thereby allowing a user to easily recognize an environment state of each of the plurality of zones.

The mobile robot and the method for controlling the mobile robot recommends an electronic device required to use a specific zone of an indoor space for a user's desired purpose based on environmental information of the indoor space, thereby allowing a user to learn how to improve an environment to use the specific zone for the user's desired purpose.

The mobile robot and the method for controlling the mobile robot recommends a suitable location for an object that a user desires to place in an indoor space based on environmental information of the indoor space, thereby enhancing harmony between the object and the indoor space.

In accordance with another aspect of the disclosure, one or more non-transitory computer-readable storage media storing computer-executable instructions that, when executed by one or more processors of a mobile robot, cause the mobile robot to perform operations are provided. The operations include collecting, by a sensor, environmental information of each of a plurality of zones of an indoor space, setting a purpose of a first zone of the plurality of zones, based on a user input or the environmental information of each of the plurality of zones, and generating information recommending a target device to be placed in the first zone, based on environmental information of the first zone and required environmental information corresponding to the set purpose.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 3 illustrates a side view of a mobile robot shown in FIG. 2 according to an embodiment of the disclosure;

FIG. 6 illustrates an environment map generated by a mobile robot according to an embodiment of the disclosure;

FIG. 16 is a flowchart illustrating a method for controlling a mobile robot according to an embodiment of the disclosure;

FIG. 17 is a flowchart illustrating a method for controlling a mobile robot after placing a target device recommended in FIG. 16 according to an embodiment of the disclosure;

FIG. 19 is a flowchart illustrating an embodiment that partially modifies a method for controlling a mobile robot described in FIGS. 16 and 17 according to an embodiment of the disclosure.

Throughout the drawings, like reference numerals will be understood to refer to like parts, components, and structures.

MODES OF THE DISCLOSURE

Figure 1:
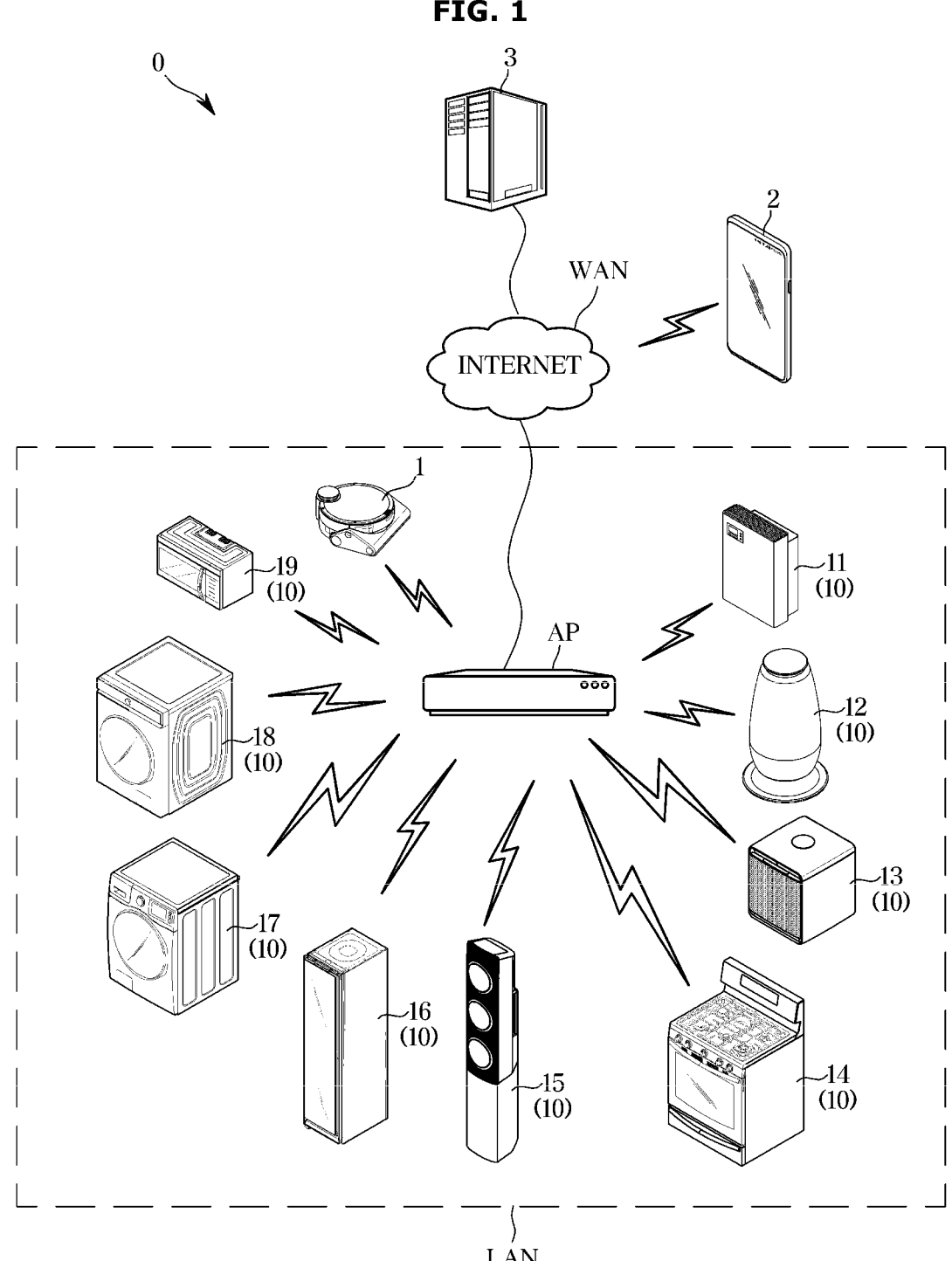
FIG. 1 illustrates a network system including a mobile robot according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms a," "an," and "the" include plural referents unless the context clearly dictates otherwise. Thus, for example, reference to "a component surface" includes reference to one or more of such surfaces.

As used herein, each of the expressions "A or B," "at least one of A and B," "at least one of A or B," "A, B, or C," "at least one of A, B, and C," and "at least one of A, B, or C," may include one or all possible combinations of the items listed together with a corresponding expression among the expressions.

For example, it will be understood that the term "at least one of a, b, or c" may include only a, only b, only c, both a and b, both a and c, both b and c, or all of a, b and c.

It will be understood that the terms "first", "second", or the like, may be used only to distinguish one component from another, not intended to limit the corresponding component in other aspects (e.g., importance or order).

When it is said that one (e.g., first) component is "coupled" or "connected" to another (e.g., second) component, with or without the terms "functionally" or "communicatively", it means that one component can be connected to the other component directly (e.g., by wire), wirelessly, or through a third component.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

An expression that one component is "connected", "coupled", "supported", or "in contact" with another component includes a case in which the components are directly "connected", "coupled", "supported", or "in contact" with each other and a case in which the components are indirectly "connected", "coupled", "supported", or "in contact" with each other through a third component.

It will also be understood that when one component is referred to as being "on" or "over" another component, it can be directly on the other component or intervening components may also be present.

The term "and/or" includes any and all combinations of one or more of a plurality of associated listed items.

Hereinafter, an operation principle and embodiments of the disclosure will be described with reference to the accompanying drawings.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 illustrates a network system including a mobile robot according to an embodiment of the disclosure.

Referring to FIG. 1, a network system 0 according to an embodiment of the disclosure may include a mobile robot 1, a user device 2, a server 3, and a home appliance 10.

The mobile robot 1 may include a communication module capable of communicating with the user device 2, the server 3, and the home appliance 10, respectively, a user interface receiving a user input or outputting information to a user, at least one processor controlling an operation of the mobile robot 1, and memory storing a program for controlling the operation of the mobile robot 1.

The home appliance 10 may include various types of electronic devices. For example, the home appliance 10 may include at least one of a humidifier 11, a dehumidifier 12, an air purifier 13, an electric oven 14, an air conditioner 15, a clothing care apparatus 16, a washing machine 17, a dryer 18, or a microwave oven 19. The aforementioned home appliances are only examples, and in addition to the aforementioned home appliances, other types of electronic devices, such as a vacuum cleaner or a television may be included in the home appliance 10.

The server 3 may include a communication module communicating with the mobile robot 1, another server, the user device 2, and the home appliance 10, respectively. The server 3 may include at least one processor processing data received from the mobile robot 1, the other server, the user device 2, and the home appliance 10, and memory storing programs for processing data or processed data. The server 3 may be implemented as a variety of computing devices, such as a workstation, a cloud, a data drive, a data station, and the like. The server 3 may be implemented as one or more server physically or logically separated based on a function, detailed configuration of function, or data, and may transmit and receive data through communication between servers and process the transmitted and received data.

The server 3 may perform functions, such as managing a user account, registering the mobile robot 1 and the home appliance 10 in association with the user account, managing or controlling the registered mobile robot 1 and home appliance 10. For example, a user may access the server 3 via the user device 2 and may generate a user account. The user account may be identified by an identifier (ID) and a password set by the user. The server 3 may register the mobile robot 1 to the user account according to a predetermined procedure. For example, the server 3 may link identification information of the mobile robot 1 (such as a serial number or medium access control (MAC) address) to the user account to register, manage, and control the mobile robot 1. The server 3 may register and control the home appliance 10 to the user account.

The user device 2 may include a communication module capable of communicating with the mobile robot 1, the server 3, and the home appliance 10, respectively. The user device 2 may include a user interface receiving a user input or outputting information to a user. The user device 2 may include at least one processor controlling an operation of the user device 2, and memory storing a program for controlling the operation of the user device 2.

The user device 2 may be carried by a user, or placed in a user's home or office, or the like. The user device 2 may include a personal computer, a terminal, a portable telephone, a smartphone, a handheld device, a wearable device, a display, and the like, without being limited thereto.

The memory of the user device 2 may store a program for controlling other mobile robot 1, i.e., an application. The application may be sold installed on the user device 2, or may be downloaded from an external server for installation.

By executing the application installed on the user device 2 by a user, the user may access the server 3, generate a user account, and perform communication with the server 3 based on the login user account to register the mobile robot 1. The home appliance 10 may be registered through the application of the user device 2.

For example, by operating the mobile robot 1 to enable the mobile robot 1 to access the server 3 according to a procedure guided by the application installed on the user device 2, the server 3 may register the mobile robot 1 with the user account by assigning the identification information (such as a serial number or MAC address) of the mobile robot 1 to the corresponding user account. The home appliance 10 may also be registered to the user account in the same manner.

A user may control the mobile robot 1 and the home appliance 10 using the application installed on the user device 2. For example, by logging into a user account with the application installed on the user device 2, the mobile robot 1 and the home appliance 10 registered in the user account appears, and by inputting a control command for the mobile robot 1 or the home appliance 10, the user device 2 may transmit a control command to the mobile robot 1 or the home appliance 10 via the server 3.

A network may include both a wired network and a wireless network. The wired network may include a cable network or a telephone network, and the wireless network may include any networks transmitting and receiving a signal via radio waves. The wired network and the wireless network may be connected to each other.

The network may include a wide area network (WAN), such as the Internet, a local area network (LAN) formed around an access point (AP), and a short range wireless network not using an AP. The short range wireless network may include Bluetooth™ (IEEE 802.15.1), Zigbee (IEEE 802.15.4), wi-fi direct, near field communication (NFC), and Z-Wave, without being limited thereto.

The AP may connect the mobile robot 1, the user device 2, or the home appliance 10 to a WAN connected to the server 3. The mobile robot 1, the user device 2, or the home appliance 10 may be connected to the server 3 via a WAN.

The AP may communicate with the mobile robot 1, the user device 2, or the home appliance 10 using wireless communication, such as Wi-Fi™ (IEEE 802.11), Bluetooth™ (IEEE 802.15.1), Zigbee (IEEE 802.15.4), or the like, and access a WAN using wired communication, without being limited thereto.

According to various embodiments of the disclosure, the mobile robot 1 may be directly connected to the user device 2, the server 3, or the home appliance 10 without going through an AP. The mobile robot 1 may be connected to the user device 2, the server 3, or the home appliance 10 via a long range wireless network or a short range wireless network.

For example, the mobile robot 1 may be connected to the user device 2 via a short range wireless network (e.g., wi-fi direct). In another example, the mobile robot 1 may be connected to the user device 2, the server 3, or the home appliance 10 via a WAN using a long range wireless network (e.g., a cellular communication module).

In still another example, the mobile robot 1 may access a WAN using wired communication, and may be connected to the user device 2, the server 3, or the home appliance 10 via a WAN. Upon accessing a WAN using wired communication, the mobile robot 1 may also act as an access point.

The mobile robot 1 may transmit information about an operation or state to the user device 2, the server 3, or the home appliance 10 via the network. For example, the mobile robot 1 may transmit information about an operation or state to the user device 2, the server 3, or the home appliance 10 upon receiving a request from the server 3, in response to an event in the mobile robot 1, or periodically or in real time.

In response to receiving the information about the operation or state from the mobile robot 1 or the home appliance 10, the server 3 may update the stored information about the operation or state of the mobile robot 1 or the home appliance 10, and may transmit the updated information about the operation and state of the mobile robot 1 or the home appliance 10 to the user device 2 via the network. Here, updating the information may include various operations in which existing information is changed, such as adding new information to the existing information, replacing the existing information with new information, and the like.

The mobile robot 1 may obtain various information from the user device 2, the server 3, or the home appliance 10, and may provide the obtained information to a user. For example, the mobile robot 1 may obtain information related to a function of the mobile robot 1 from the server 3 and various environmental information (e.g., weather, temperature, humidity, or the like), and may output the obtained information via a user interface.

The mobile robot 1 or the home appliance 10 may operate according to a control command received from the user device 2 and the server 3. For example, the mobile robot 1 may operate in accordance with a control command received from the server 3, based on a prior authorization obtained from a user to operate in accordance with the control command of the server 3 even without a user input. Here, the control command received from the server 3 may include a control command input by the user via the user device 2 or a control command based on preset conditions, without being limited thereto.

The user device 2 may transmit information about a user to the mobile robot 1, the server 3, or the home appliance 10 through the communication module. For example, the user device 2 may transmit information about a user's location, a user's health status, a user's preference, a user's schedule, or the like, to the server 3. The user device 2 may transmit information about the user to the server 3 based on the user's prior authorization.

The mobile robot 1, the user device 2, the server 3, or the home appliance 10 may use Artificial Intelligence (AI) to determine a control command. For example, the server 3 may process information about an operation or a state of the mobile robot 1 or the home appliance 10 and information about a user of the user device 2 using techniques, such as artificial intelligence, and may transmit a processing result or a control command to the mobile robot 1, the user device 2, or the home appliance 10 based on the processing result.

The mobile robot 1 may include a robot capable of autonomous driving. The mobile robot 1 may be exemplified as a robot cleaner (cleaning robot) capable of cleaning an indoor space. However, the mobile robot 1 is not limited to a robot cleaner, and may have various forms.

Figure 2:
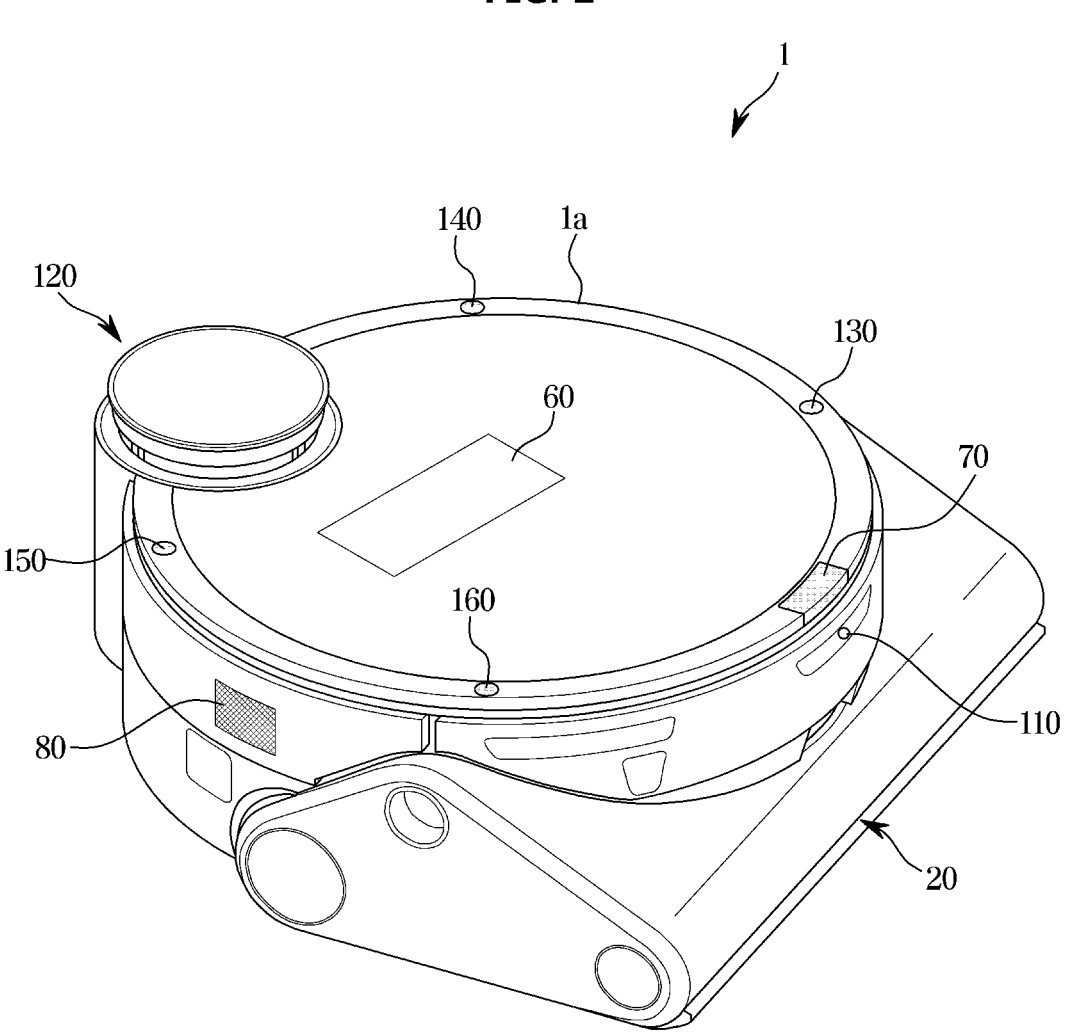
FIG. 2 illustrates a mobile robot according to an embodiment of the disclosure.
Figure 3:
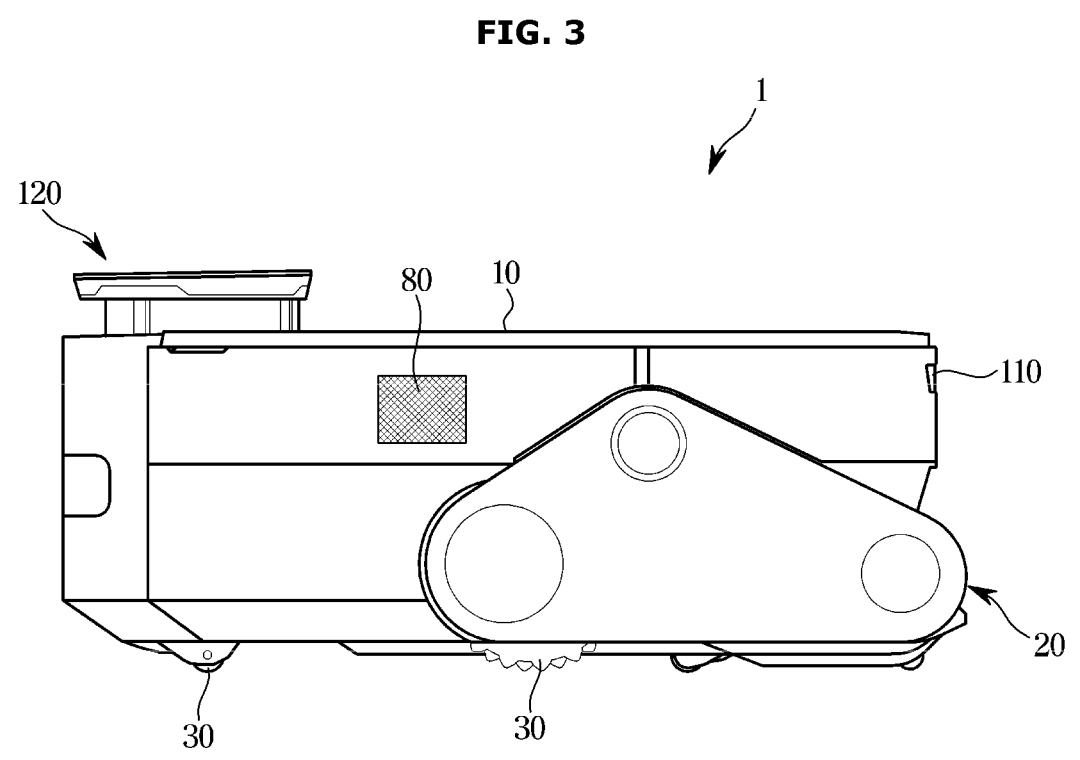

FIG. 2 illustrates a mobile robot according to an embodiment of the disclosure. FIG. 3 illustrates a side view of a mobile robot shown in FIG. 2 according to an embodiment of the disclosure.

Referring to FIGS. 2 and 3, the terms "forward (or front)", "rearward (or back)", "upward (or up), "downward (or down)", "left" and "right" are defined with respect to a direction in which the mobile robot 1 moves forward, but the terms may not restrict the shapes and positions of the respective components. Furthermore, an expression that indicates a direction is used to clearly understand the disclosure, and the direction may be defined otherwise.

Referring to FIGS. 2 and 3, the mobile robot 1 may include a main body 1a, and a wheel 30 arranged to be rotatable around an axis parallel to the ground to move the main body 1a. The main body 1a may include a case that defines an external appearance. A plurality of wheels 30 may be arranged. For example, two or more wheels 30 may be arranged underneath the main body 1a. The wheel 30 may include a wheel motor, and may rotate according to rotational force generated by the wheel motor.

A brush assembly 20 may be provided on the front of the main body 1a. A brush may scatter debris present in a travel path of the main body 1a. The brush may be located at an intake port formed on a bottom surface of the main body 1a, and scatter the debris to the inside of the intake port while rotating around a rotation axis perpendicular to a forward direction of the main body 1a. Although not illustrated, an intake fan 40 for generating a suction power to draw in the debris and a dust container for storing the debris may be arranged in the main body 1a.

A user interface 60 may be provided on an upper surface of the main body 1a. It is illustrated in FIG. 2 that the user interface 60 is arranged on the upper surface of the main body 1a, but is not limited thereto. The user interface 60 may obtain a user input. The user interface 60 may provide various information about operations of the mobile robot 1. The user interface 60 may include an inputter 61 and a display 62.

The mobile robot 1 may include a microphone 70 for detecting external sound. The microphone 70 may detect a voice of a user. The mobile robot 1 may include a speaker 80 for outputting various effective sounds and voices related to operations of the mobile robot 1. The microphone 70 and the speaker 80 may be arranged in the main body 1*a*.

The mobile robot 1 may include a variety of sensors. For example, the mobile robot 1 may include at least one of a camera 110, a light detection and ranging (lidar) sensor 120, a temperature sensor 130, a humidity sensor 140, an illuminance sensor 150, or a dust sensor 160. The sensors may be located in the main body 1*a*. At least some of the sensors may be arranged to be exposed to the outside of the main body 1*a*.

The camera 110 may be provided on the front of the main body 1*a*. The camera 110 may generate an image with a field of view (FOV) toward the front of the main body 1*a*. A location of the camera 110 is not limited to the front of the main body 1*a*. The camera 110 may be provided at various positions to capture surroundings of the mobile robot 1. The camera 110 may be located on a side and/or back of the main body 1*a*.

The camera 110 may include an image sensor for generating image data by collecting incident light from the outside. For example, the camera 110 may include at least one of a red-green-blue (RGB) camera for generating a color image by collecting visible rays, or an infrared camera for generating an infrared image. The camera 110 may include a binocular camera (stereo camera). The binocular camera may obtain information about depth to an object by using binocular disparity. The image data obtained by the camera 110 may be transmitted to a controller 200 of the mobile robot 1. The controller 200 may identify an external object by processing the image data.

The lidar sensor 120 may emit light (pulse laser) to the outside, and receive light of a preset direction among rays reflecting from an external object. The lidar sensor 120 may rotate 360 degrees clockwise or counterclockwise. The lidar sensor 120 may emit light and receive reflected light at 360 degrees, and thus the mobile robot 1 may use the lidar sensor 120 to detect external objects from all directions.

Lidar data generated by the lidar sensor 120 may be transmitted to the controller 200 of the mobile robot 1. The lidar data may include light propagation direction information and information about a distance to an external object. The controller 200 may process the lidar data to perform three-dimensional (3D) modeling of an indoor space. The controller 200 may process the lidar data to obtain 3D data of an external object.

The temperature sensor 130 may obtain temperature data of the indoor space in which the mobile robot 1 travels. The temperature sensor 130 may transmit an electrical signal corresponding to the obtained temperature data to the controller 200. The humidity sensor 140 may obtain humidity data of the indoor space in which the mobile robot 1 travels. The humidity sensor 140 may transmit an electrical signal corresponding to the obtained humidity data to the controller 200.

The illuminance sensor 150 may obtain illuminance data of the indoor space in which the mobile robot 1 travels. The illuminance sensor 150 may detect solar light that enters the indoor space. The illuminance sensor 150 may also detect solar light that reflects from an object in the indoor space. The illuminance sensor 150 may also detect lamp light emitted from a lamp located in the indoor space. The illuminance sensor 150 may transmit an electrical signal corresponding to the obtained illuminance data to the controller 200.

The dust sensor 160 may obtain dust data of the indoor space in which the mobile robot 1 travels. The dust data may include a concentration of dust in the air. The dust data may correspond to air quality data.

In addition to the above, various sensors may be provided in the mobile robot 1. For example, the mobile robot 1 may further include at least one of a gas sensor for detecting a harmful gas in the air, an air flow meter for measuring an airflow in the indoor space, a shock sensor 170 for detecting shock with an external object, a gyro sensor for detecting motion of the mobile robot 1, an inertial measurement unit (IMU) for detecting acceleration, speed and direction of the mobile robot 1, a time-of-flight (ToF) sensor for measuring a distance to an external object, a radio frequency (RF) sensor, an ultrasound sensor, or a radar sensor.

Figure 4:
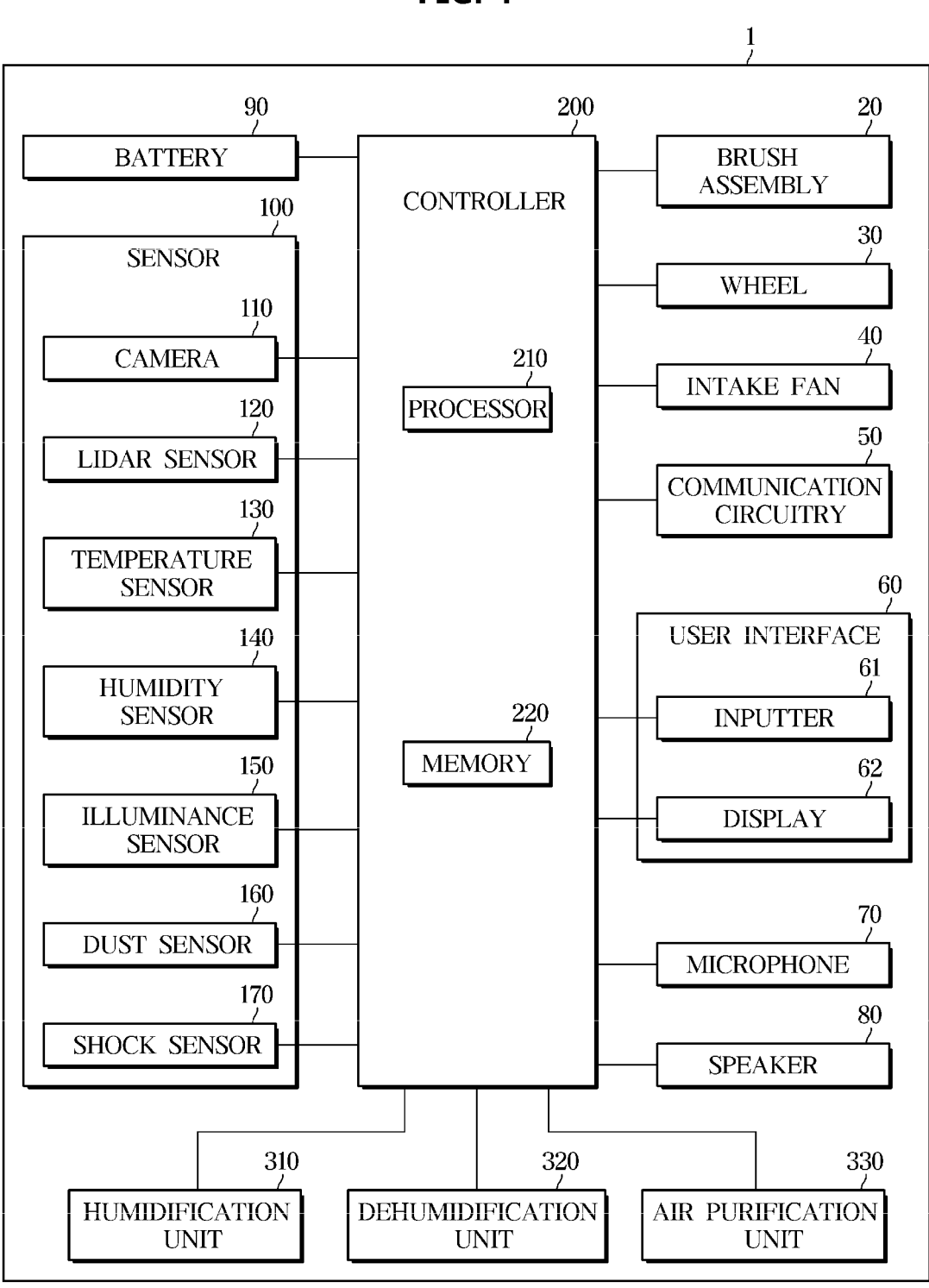
FIG. 4 is a control block diagram of a mobile robot according to an embodiment of the disclosure.

FIG. 4 is a control block diagram of a mobile robot according to an embodiment of the disclosure.

Referring to FIG. 4, the mobile robot 1 may include the wheel 30, a communication circuitry 50, the user interface 60, a battery 90, a sensor 100, and the controller 200. The mobile robot 1 may further include the brush assembly 20 and the intake fan 40. The mobile robot 1 may also include the microphone 70 and the speaker 80. The mobile robot 1 may further include at least one of a humidification unit 310, a dehumidification unit 320, or an air purification unit 330.

The controller 200 may control components of the mobile robot 1. The controller 200 may include a processor 210 and memory 220. The processor 210 may include logic circuits and operation circuits in hardware. The processor 210 may control the electrically connected components of the mobile robot 1 based on a program, instructions and/or data stored in the memory 220 for an operation of the mobile robot 1. The controller 200 may be implemented with a control circuit including circuit elements, such as a condenser, an inductor and a resistor. The processor 210 and the memory 220 may be implemented in separate chips or in a single chip. Furthermore, the controller 200 may include a plurality of processors and a plurality of memories.

The memory 220 may store the program, application and/or data for the operation of the mobile robot 1, and store data generated by the processor 210. The memory 220 may include non-volatile memory, such as read only memory (ROM) and flash memory for storing the data for a long time. The memory 220 may include volatile memory for temporarily storing data, such as static random-access memory (SRAM) and dynamic random access memory (DRAM).

The brush assembly 20 may include a brush and a brush motor. A rotational force generated by the brush motor may rotate the brush. A rotation speed of the brush may be controlled by controlling a rotation speed of the brush motor. A degree of scattering debris in a travel path of the mobile robot 1 may vary depending on the rotation speed of the brush.

The wheel 30 may move the main body 1*a*. The wheel 30 may include a wheel motor, and may rotate according to a rotational force generated by the wheel motor. The wheel 30 may be provided in a plurality, and each of the plurality of wheels may be controlled separately. As a direction in which the plurality of wheels rotate is changed, a direction in which the mobile robot 1 travels may be changed. Furthermore, a speed of the mobile robot 1 may be controlled by controlling a rotation speed of each of the plurality of wheels.

The intake fan 40 may draw in the debris scattered by the brush assembly 20 to be moved into the dust container. The intake fan 40 may rotate according to a rotational force of an intake motor, and the rotation of the intake fan 40 may generate a suction power to draw in the debris. The suction power may be controlled by controlling the rotation speed of the intake fan 40.

The communication circuitry 50 may perform connection with at least one of the user device 2, the server 3, or the home appliance 10 via a network. The controller 200 may obtain various information, various signals and/or various data from the user device 2, the server 3, and the home appliance 10 through the communication circuitry 50. For example, the communication circuitry 50 may receive a remote control signal from the user device 2. The controller 200 may obtain an AI model used to process various data from the server 3 through the communication circuitry 50.

The communication circuitry 50 may include various communication circuits. The communication circuitry 50 may include a wireless communication circuit and/or a wired communication circuit. The wireless communication circuit may support various wireless communication, such as a wireless local area network (LAN), home radio frequency (RF), infrared communication, ultra-wide band (UWB) communication, wi-fi, Bluetooth, Zigbee and a long range wireless network (e.g., cellular communication).

The user interface 60 may obtain a user input. The user interface 60 may provide various information about operations of the mobile robot 1. The user interface 60 may include the inputter 61 and the display 62.

The inputter 61 may obtain a user input. The user input may include a variety of commands. For example, the inputter 61 may obtain a power-on command, a power-off command, an operation start command, an operation stop command, or a charge command. The user input may be obtained from the user device 2. The inputter 61 may transmit, to the controller 200, an electrical signal (voltage or current) corresponding to the user input.

The inputter 61 may include at least one of various buttons or a dial. For example, the inputter 61 may include at least one of a power button to power on or off the mobile robot 1, a start/stop button to start or stop cleaning, or a docking button to force the mobile robot 1 to return to a charging station. The buttons may be provided as physical buttons or touch buttons.

The display 62 may display information related to an operation of the mobile robot 1. The display 62 may display information input by a user or information to be provided to the user in various screens. The display 62 may display information related to an operation of the mobile robot 1 in at least one of an image or text. For example, the display 62 may display battery information. Furthermore, the display 62 may display a graphical user interface (GUI) that enables the mobile robot 1 to be controlled. In other words, the display 62 may display a user interface element (UI element), such as an icon.

The display 62 may be provided in various types of display panels. For example, the display 62 may include a liquid crystal display (LCD) panel, a light emitting diode (LED) panel, an organic light emitting diode (OLED) panel, or a micro LED panel. The display 62 may include a touch display that serves as an input device as well.

The display 62 and the inputter 61 may be provided separately or in a single device (e.g., a touch display).

The microphone 70 may detect an external sound, such as a voice of a user. The microphone 70 may convert the user voice, which is an analog signal, into a data signal and transmit the data signal to the controller 200. The controller 200 may identify a command included in the user voice by analyzing the user voice, and control an operation of the mobile robot 1 based on the identified command.

The controller 200 may control an operation of the mobile robot 1 based on a command received from at least one of the inputter 61, the display 62, the microphone 70, or the user device 2.

The speaker 80 may output information input by a user or information provided to the user in various sounds. For example, the controller 200 may control the speaker 80 to output various sounds of at least one of an operation state of the mobile robot 1, an operation state of the home appliance 10, or environmental information of the indoor space.

The battery 90 may supply power to various electronic components included in the mobile robot 1. For example, the battery 90 may supply power to each of the wheel 30, the intake fan 40, the communication circuitry 50, the user interface 60, the microphone 70, the speaker 80, the sensor 100 and the controller 200. The power supplied from the battery 90 may be transformed by the controller 200 and then supplied to the respective electronic components.

The sensor 100 may include an image sensor for obtaining image data with a field of view toward the outside of the main body 1*a*, and a non-image sensor for obtaining data about an environment outside the main body 1*a* and a movement of the mobile robot 1. The camera 110 and the lidar sensor 120 may be included in the image sensor. The temperature sensor 130, the humidity sensor 140, the illuminance sensor 150, the dust sensor 160 and the shock sensor 170 may be included in the non-image sensor. The non-image sensor may further include at least one of a gas sensor for detecting a harmful gas in the air, an air flow meter for measuring an airflow in the indoor space, a wheel sensor for detecting a rotation speed of the wheel 30, a gyro sensor for detecting motion of the mobile robot 1, or an inertial measurement unit (IMU) for detecting acceleration, speed and direction of the mobile robot 1.

The camera 110 may obtain image data with a field of view toward a forward direction of the main body 1*a*. The camera 110 may transmit the image data and/or an image signal to the controller 200. The controller 200 may process the image data and/or image signal obtained by the camera 110 to generate an image. An image may include a plurality of image frames obtained at predetermined intervals. In other words, a video may be generated by arranging a plurality of image frames in a time series.

The lidar sensor 120 may obtain lidar data with omnidirectional fields of view of the main body 1*a*. The lidar sensor 120 may transmit the lidar data to the controller 200. The controller 200 may process the lidar data to generate a lidar image.

The controller 200 may control driving of the mobile robot 1 based on at least one of the image data obtained by the camera 110 or the lidar data obtained by the lidar sensor 120. The controller 200 may process at least one of the image data obtained by the camera 110 or the lidar data obtained by the lidar sensor 120 to identify various objects located around the mobile robot 1.

The controller 200 may use an AI model, obtained from the memory 220 or the server 3, to identify an external object from at least one of the image data or the lidar data, and may detect a feature of the external object. For example, the controller 200 may detect a size, shape, brightness, definition, transparency, position and/or color of the external object. In addition, the controller 200 may estimate a distance to the external object and a height of the external object by using depth information included in at least one of the image data or the lidar data. The controller 200 may identify an obstacle in a travel path of the mobile robot 1 by processing at least one of the image data or the lidar data, and may control the wheel 30 to avoid the obstacle.

A sensor for identifying an external object is described as the camera 110 and the lidar sensor 120, but is not limited thereto. An external object may be identified from data obtained using various sensors, such as an ultrasound sensor or a radar sensor.

The temperature sensor 130 may obtain temperature data of a plurality of zones in the indoor space while the mobile robot 1 travels in the indoor space. The temperature sensor 130 may transmit an electrical signal corresponding to the obtained temperature data to the controller 200. The humidity sensor 140 may obtain humidity data of the plurality of zones in the indoor space while the mobile robot 1 travels in the indoor space. The humidity sensor 140 may transmit an electrical signal corresponding to the obtained humidity data to the controller 200.

The illuminance sensor 150 may obtain illuminance data of the plurality of zones in the indoor space while the mobile robot 1 travels in the indoor space, and may transmit an electrical signal corresponding to the obtained illuminance data to the controller 200. Illuminance refers to a density of incoming luminous flux per unit area. The illuminance sensor 150 may detect solar light that enters the indoor space. The illuminance sensor 150 may also detect solar light that reflects from an object in the indoor space. The illuminance sensor 150 may also detect lamp light emitted from a lamp located in the indoor space.

The dust sensor 160 may obtain dust data of the indoor space in which the mobile robot 1 travels. The dust data may include a concentration of dust in the air. The dust data may correspond to air quality data. The dust sensor 160 may transmit an electrical signal corresponding to the obtained dust data to the controller 200.

In addition, the controller 200 may obtain environmental data from other environmental sensors installed in the indoor space. For example, at least one of the illuminance sensor, the temperature sensor, the humidity sensor, or the dust sensor may be installed on a ceiling, wall, window, and the like, of the indoor space. The other environmental sensors installed in the indoor space may communicate with the mobile robot 1.

The shock sensor 170 may detect shock between the main body 1*a* and an external object, and may obtain shock data. The controller 200 may change a travel direction and travel path of the mobile robot 1 based on the shock data obtained by the shock sensor 170. In addition, the controller 200 may identify whether an obstacle exists at a collision location based on the shock data.

The humidification unit 310 may spray water to the outside of the main body 1*a*. The humidification unit 310 may include a water container. The humidification unit 310 may include a heater for heating the water contained in the water container and converting the water to water vapor, and/or an ultrasonic vibration plate for vibrating the water contained in the water container and breaking the water into very small water droplets. The humidification unit 310 may perform functions of an evaporative humidifier, a heating humidifier, and/or an ultrasonic humidifier.

The dehumidification unit 320 may absorb moisture in the air. The dehumidification unit 320 may include a heat pump including a compressor, an evaporator, and a condenser. Through a refrigerant cycle of the compressor, evaporator, and condenser, the evaporator may absorb heat from the air, and the moisture in the air that has lost the heat may condense in the evaporator. The dehumidification unit 320 may include a water container that collects the condensed water.

The air purification unit 330 may draw in air and discharge clean air from which foreign substances have been removed to the outside of the main body 1*a*. The air purification unit 330 may include a fan for drawing in air and a filter for removing foreign substances.

The components of the mobile robot 1 are not limited to those illustrated in FIG. 4. Some of the components illustrated in FIG. 4 may be omitted, or other components may be further included in the mobile robot 1.

The controller 200 of the mobile robot 1 may identify a plurality of zones in the indoor space, based on various data obtained by the sensor 100 while the mobile robot 1 travels in the indoor space, and may generate a map of the indoor space including the plurality of zones. The controller 200 may generate various types of maps of the plurality of zones in the indoor space based on the various data obtained by the sensor 100.

For example, the controller 200 may generate a reference map of the indoor space, and identify a location of the mobile robot 1 in the indoor space by using at least one of image data or lidar data obtained while the mobile robot 1 travels in the indoor space. To generate the reference map, a simultaneous localization and mapping (SLAM) algorithm may be used. The SLAM is an algorithm capable of making a map of the space in which the mobile robot 1 is traveling and simultaneously, estimating a location of the mobile robot 1 in the map. The reference map may include structural information of the indoor space. The reference map may be stored in the memory 220. The controller 200 may update the reference map at predetermined intervals or each time a changed indoor structure is detected.

In addition, the controller 200 may obtain environmental information for each of the plurality of zones of the indoor space from the sensor 100. The controller 200 may generate an environment map including the environmental information for each of the plurality of zones. For example, the environmental information may include at least one of temperature information obtained by the temperature sensor 130, humidity information obtained by the humidity sensor 140, illuminance information obtained by the illuminance sensor 150, or dust information obtained by the dust sensor 160.

In addition to the above, various environmental information may be obtained. For example, the environmental information may include harmful gas information obtained by the gas sensor, air flow information obtained by the air flow meter, noise information obtained by the microphone 70, color information and color temperature information of the indoor space obtained by the camera 110, and wi-fi signal information obtained by the communication circuitry 50.

The controller 200 of the mobile robot 1 may map environmental data obtained by the sensor 100 to the reference map. The controller 200 may identify a location of the mobile robot 1 on the reference map. The controller 200 may generate the environment map by obtaining the environmental information while the mobile robot 1 travels in the indoor space, and mapping a point where the environmental information is obtained to the location of the mobile robot 1 on the reference map.

The reference map and the environment map may also be generated by the server 3. The mobile robot 1 may transmit the various data obtained by the sensor 100 to the server 3.

The server 3 may process the data received from the mobile robot 1 to generate the reference map and the environment map, and may transmit the generated reference map and environment map to the mobile robot 1 and the user device 2.

Environments of each of the plurality of zones of the indoor space may be the same or different from each other. The environment of each zone may be determined by at least one environmental factor. The environmental factor may be included in the environmental information obtained by the sensor 100. For example, in a case where there are three rooms in the indoor space, the environments of each of the rooms may be the same or different from each other. A temperature of a first room may be different from a temperature of a second room and a temperature of a third room. A humidity of the first room may be different from a humidity of the second room and a humidity of the third room. An illuminance of the first room may be different from an illuminance of the second room and an illuminance of the third room. A dust concentration in the first room may be different from a dust concentration in the second room and a dust concentration in the third room.

In addition, each room may have zones with different environments. For example, each room may be divided into at least one zone according to environmental information. For example, within the first room, a first zone and a second zone with different temperatures (or humidity, illuminance, dust concentration, or the like) may exist. A value of environmental factor (temperature, humidity, illuminance, dust concentration, or the like) detected in an area adjacent to a wall of the first room may be different from a value of environmental factor (temperature, humidity, illuminance, dust concentration, or the like) detected in a central area of the first room. A value of environmental factor detected in an area adjacent to a door of the first room may be different from a value of environmental factor detected in an area relatively distant from the door of the first room. Each of the plurality of zones in the first room may have different environments due to various objects (e.g., desks, beds, bookshelves, closets, other home appliances, or the like) present in the first room.

The controller 200 may generate environmental information including at least one environmental factor (e.g., temperature, humidity, illuminance, dust concentration) related to each of the plurality of zones of the indoor space. The controller 200 may generate an environment map including the plurality of zones of the indoor space and environmental information for each of the plurality of zones. The controller 200 may generate different environment maps depending on types of environmental factors that determine an environment of each of the plurality of zones. The controller 200 may generate an environment map showing a distribution of one environmental factor in the indoor space. In addition, the controller 200 may generate an environment map including evaluation information evaluating at least one environmental factor.

For example, the controller 200 may generate a temperature distribution map including temperature information of each of the plurality of zones. The controller 200 may generate a humidity distribution map including humidity information of each of the plurality of zones. The controller 200 may generate an illuminance distribution map including illuminance information of each of the plurality of zones. The controller 200 may generate a dust distribution map including dust information of each of the plurality of zones. The controller 200 may generate an environmental evaluation map including evaluation information evaluating at least one of temperature, humidity, illuminance, or dust concentration of each of the plurality of zones.

The environmental factors are not limited to the temperature, humidity, illuminance, and dust concentration. Various types of environmental factors may be detected by the sensor 100.

In addition, the environmental information obtained in each of the plurality of zones of the indoor space may vary depending on time. For example, environmental information obtained in the morning may be different from environmental information obtained in the afternoon. The controller 200 may generate an environment map based on environmental information obtained at predetermined time intervals. The controller 200 may integrate environmental information obtained at different times and generate an environment map including environmental information for a certain period of time (e.g., one day, one week, one month, and the like).

The mobile robot 1 may provide the user device 2 with the environment map including the environmental information about each of the plurality of zones of the indoor space. The user device 2 may display the environmental information and the environment map received from the mobile robot 1. The environmental information and the environment map may be provided to a user through the user interface 60 of the mobile robot 1.

The user may operate the user device 2 or the user interface 60 of the mobile robot 1 to select a specific zone from the plurality of zones on the environment map, set a purpose (use) for the specific zone, or select an object to be placed in the specific zone. The controller 200 of the mobile robot 1 may obtain a user input for setting a purpose of the specific zone among the plurality of zones included in the environment map through the user device 2 or the user interface 60. The controller 200 of the mobile robot 1 may obtain a user input for selecting an object to be placed in at least one of the plurality of zones included in the environment map through the user device 2 or the user interface 60.

The controller 200 may compare environmental information of the specific zone with required environmental information corresponding to the set purpose or selected object according to the user input. The required environmental information and the environmental information of specific zone may be obtained from the memory 220 or the server 3.

The purpose set by the user input or the object selected by the user input may not be included in a database stored in the memory 220. In this case, the controller 200 may use an artificial intelligence (AI) model to determine another purpose or another object that has a relatively high similarity to the set purpose or selected object, and may compare current environmental information of the specific zone with required environmental information corresponding to the determined other purpose or other object. The controller 200 may request the server 3 for required environmental information corresponding to a purpose or object that is not stored in the memory 220.

The controller 200 may determine a suitability between the set purpose and the specific zone based on the required environmental information corresponding to the set purpose and the current environmental information of the specific zone. The controller 200 may determine a suitability between the selected object and the specific zone based on the required environmental information corresponding to the selected object and the environmental information of the specific zone.

The environmental information of the specific zone may include at least one environmental factor (e.g., temperature, humidity, illuminance, dust concentration) that determines an environment of the specific zone, and a representative value of each of the at least one environmental factor. The representative value of each environmental factor is an index representing a current environment of specific zone, and may be an average or a median value of values measured at multiple locations in the specific zone. The representative value of each environmental factor may be an average or a median value of values measured at multiple times in the specific zone. For example, in a case where the environmental factor is temperature, an average or a median value of a plurality of temperature values obtained at different times in the specific zone may be determined as a representative value.

The controller 200 may determine a reference value for at least one environmental factor, based on required environmental information corresponding to the set purpose. The reference value refers to an optimal value of each environmental factor required to use a specific zone for a set purpose. In other words, a reference value of each environmental factor may vary depending on a set purpose. The required environmental information may include at least one environmental factor required for a set purpose and an optimal value of each of the at least one environmental factor.

In a case where a user selects an object to be placed in the specific zone instead of a purpose, a reference value of each environmental factor may be determined according to required environmental information corresponding to the selected object.

In a case where a purpose of the indoor space or an object to be placed in the indoor space is not selected by the user, a reference value of environmental factor may be set to a predetermined default value. The default value may be a value of an environmental factor that statistically makes the indoor space comfortable.

The controller 200 may determine a suitability to be higher, as a difference between a representative value of at least one environmental factor and a reference value is smaller. The smaller a difference between required environmental information and current environmental information of a specific zone, the higher a suitability between a set purpose and the specific zone may be determined. In contrast, the greater the difference between the required environmental information and the current environmental information of the specific zone, the lower the suitability may be determined. A suitability between a selected object and a specific zone may also be determined in the same manner.

A suitability between a set purpose and a specific zone, or a suitability between a selected object and a specific zone, may be provided as a score or index. For example, the controller 200 may determine an evaluation score for each of at least one environmental factor based on a difference between a reference value and a representative value of each of the at least one environmental factor. The controller 200 may provide a weight, determined by required environmental information, to the evaluation score of each of at least one environmental factor. The controller 200 may determine a suitability by summing evaluation scores of each of the at least one weighted environmental factor.

The controller 200 may generate recommendation information that recommends a target device to be placed in the specific zone according to the suitability between the set purpose and the specific zone or the suitability between the selected object and the specific zone. The target device may correspond to at least one home appliance 10. The controller 200 may provide the recommendation information to the user device 2. The recommendation information may be provided through the user interface 60 of the mobile robot 1.

The controller 200 may determine an optimal location of the target device in the specific zone to optimize the suitability between the specific zone and the purpose or the object selected according to the user input. The specific zone may be divided into a plurality of regions depending on environmental information. Each of the plurality of regions may have different environments due to various objects (e.g., desks, beds, bookshelves, closets, other home appliances, or the like) present in the specific zone. For example, a plurality of regions with different values of environmental factors may exist even in the specific zone. Accordingly, even within a specific zone, a suitability between a set purpose and the specific zone may vary depending on where the target device is located. The mobile robot 1 may determine an optimal location of the target device to maximize the suitability between the purpose or object and the specific zone. The optimal location of the target device may be included in recommendation information recommending the target device. The controller 200 may further consider types, sizes, and locations of various objects existing in the specific zone to determine the suitability and the optimal location.

For example, a purpose of a specific zone selected by a user may be set as a baby room. In a case where required environmental information required to use the specific zone as a baby room is different from current environmental information of the specific zone, the home appliance 10 that may change a current environment of the specific zone to a required environment may be recommended as a target device. In response to a current humidity of a specific zone being lower than a required humidity, a 'humidifier' may be recommended as a target device. In response to a current temperature of a specific zone being higher or lower than a required temperature, an 'air conditioner' that may perform cooling or heating may be recommended as a target device. In response to a current dust concentration in a specific zone being higher than a required dust concentration, an 'air purifier' may be recommended as a target device. In response to a current illuminance of a specific zone being lower than a required illuminance, a 'lighting device' may be recommended as a target device. In response to a current illuminance of a specific zone being higher than a required illuminance, an 'electric curtain' that may block sunlight entering the indoor space may be recommended as a target device. In response to a current color temperature of a specific zone being lower than a required color temperature, a 'display device,' such as a television that may display images of various colors may be recommended as a target device. As such, a recommended target device may vary depending on which environmental factors are included in required environmental information.

The controller 200 of the mobile robot 1 may identify whether the target device is placed in the optimal location according to the recommendation information, based on at least one of image data obtained by the camera 110 or lidar data obtained by the lidar sensor 120. The controller 200 may provide a location movement notification to the user device 2, based on the target device being placed in an arbitrary location different from the optimal location in the specific zone. The location movement notification may be provided through the user interface 60 or speaker 80 of the mobile robot 1.

Based on the target device being placed in the specific zone, the controller 200 may control an operation of the target device to allow the suitability between the set purpose and the specific zone to reach a predetermined optimal index. For example, in response to a current humidity of a specific zone being significantly different from a required humidity corresponding to a set purpose, a suitability between the set purpose and the specific zone may be calculated to be lower than the optimal index. In this case, the controller 200 may control an operation of a humidifier placed in the specific zone to increase the humidity in the specific zone. Accordingly, the suitability between the set purpose and the specific zone may reach the optimal index.

In addition, in a case where another controllable home appliance 10 exists in the specific zone, the mobile robot 1 may control an operation of the other home appliance 10 to change an environment of the specific zone to suit the set purpose.

The controller 200 may identify an event in which an environment of the specific zone is changed after the suitability between the set purpose and the specific zone reaches the predetermined optimal index. The controller 200 may generate event information including information about abnormal operation of the target device as well as information about the environmental change. The controller 200 may provide the user device 2 with the event information corresponding to the identified event. The event information may be provided through at least one of the user interface 60 or the speaker 80 of the mobile robot 1. In other words, the mobile robot 1 may monitor whether the environment of the specific zone is maintained for its purpose. The mobile robot 1 may monitor whether a value or numerical value representing environmental information of the specific zone is outside a range determined by the set purpose. In addition, the mobile robot 1 may learn a range of changes in environmental information based on a user's response to the occurrence of event, and may then use the learned range to identify the event related to the change in environmental information.

The controller 200 may control an operation of at least one of the target device or another device located in the specific zone in response to the environmental change in the specific zone. Even in a case where the environment of the specific zone changes for some reason, the environment of the specific zone may be maintained for the user's desired purpose by properly controlling at least one of the target device or the other device in the specific zone.

The controller 200 may provide the event information to the user device 2, based on the event being identified while a user is not in the indoor space. When a user is outside, the user cannot directly check the event that changes the environment of the indoor space. By providing the event information to the user when the user is not in the indoor space, the user may recognize the environmental change in the indoor space. The event information may be provided through the user device 2 or the mobile robot 1, when the user is present in the indoor space.

Whether a user is in an indoor space may be confirmed in various manners. For example, the mobile robot 1 may confirm whether the user is in the indoor space by sequentially traveling a plurality of zones of the indoor space. The mobile robot 1 may obtain location information of the user device 2 from the user device 2, and may identify that the user is not in the indoor space, based on the user device 2 being located outdoors. The mobile robot 1 may obtain information about a user's location from other electronic devices located in the indoor space.

As such, the mobile robot 1 according to the disclosure may recommend an electronic device suitable for the specific zone of the indoor space based on the environmental information about the plurality of zones of the indoor space.

Accordingly, a user may easily recognize how to improve an environment of the specific zone of the indoor space to suit a user's desired purpose. In addition, the mobile robot 1 according to the disclosure may continuously monitor the environment of the specific zone to detect whether the environment changes differently from the user's purpose, and may notify the user of the change. The user may easily make the environment of the indoor space for the user's purpose based on the information provided by the mobile robot 1.

Figure 5:
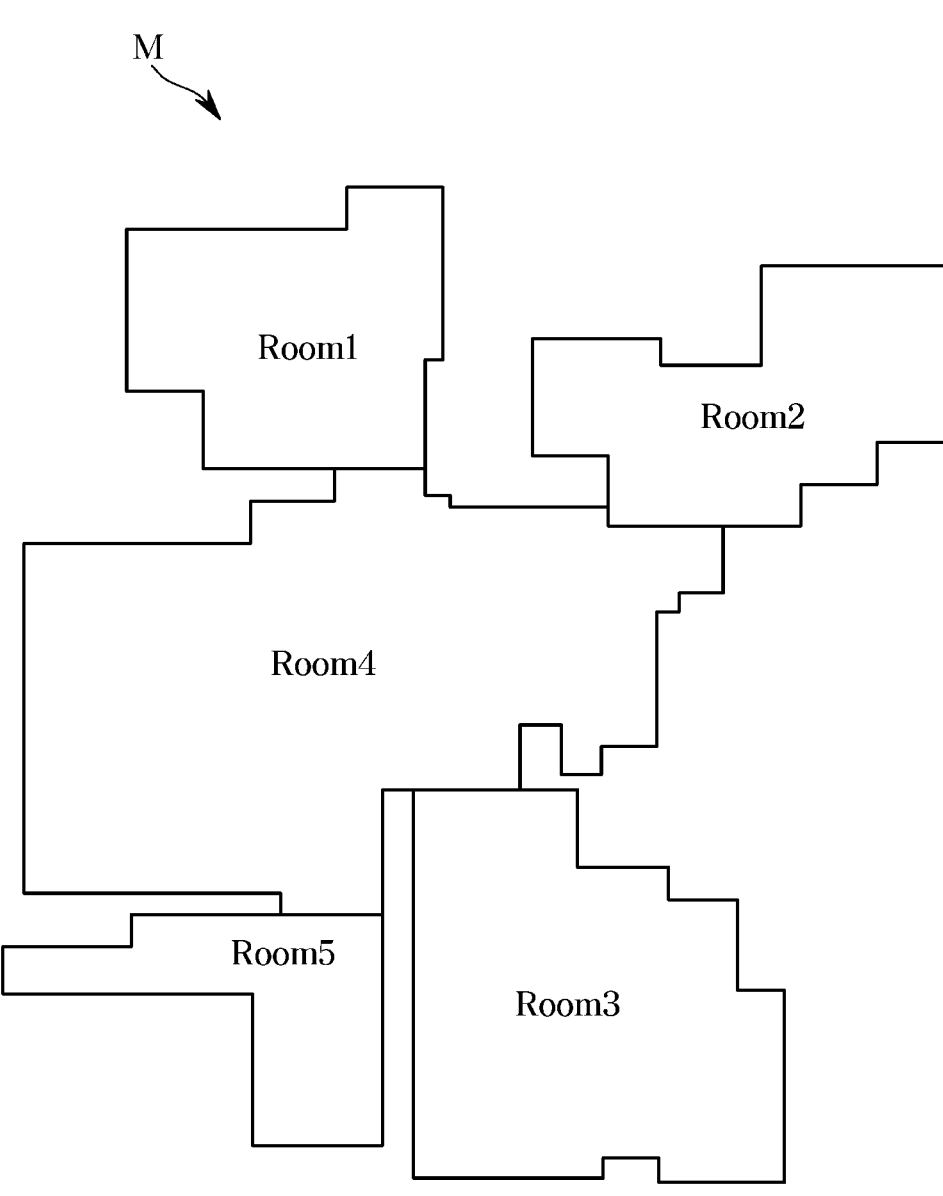
FIG. 5 illustrates a map of an indoor space generated by a mobile robot according to an embodiment of the disclosure.
Figure 6:
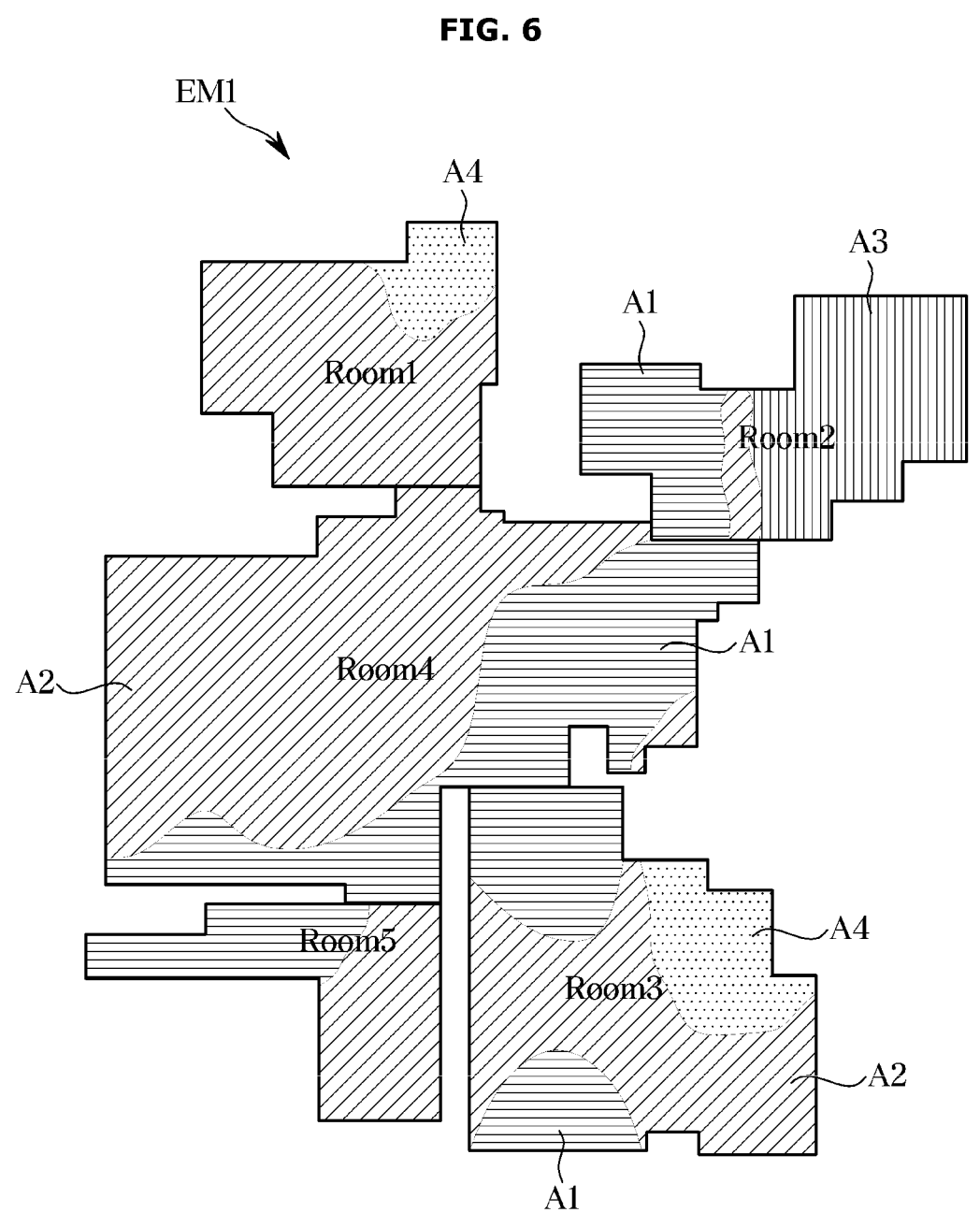
Figure 7:
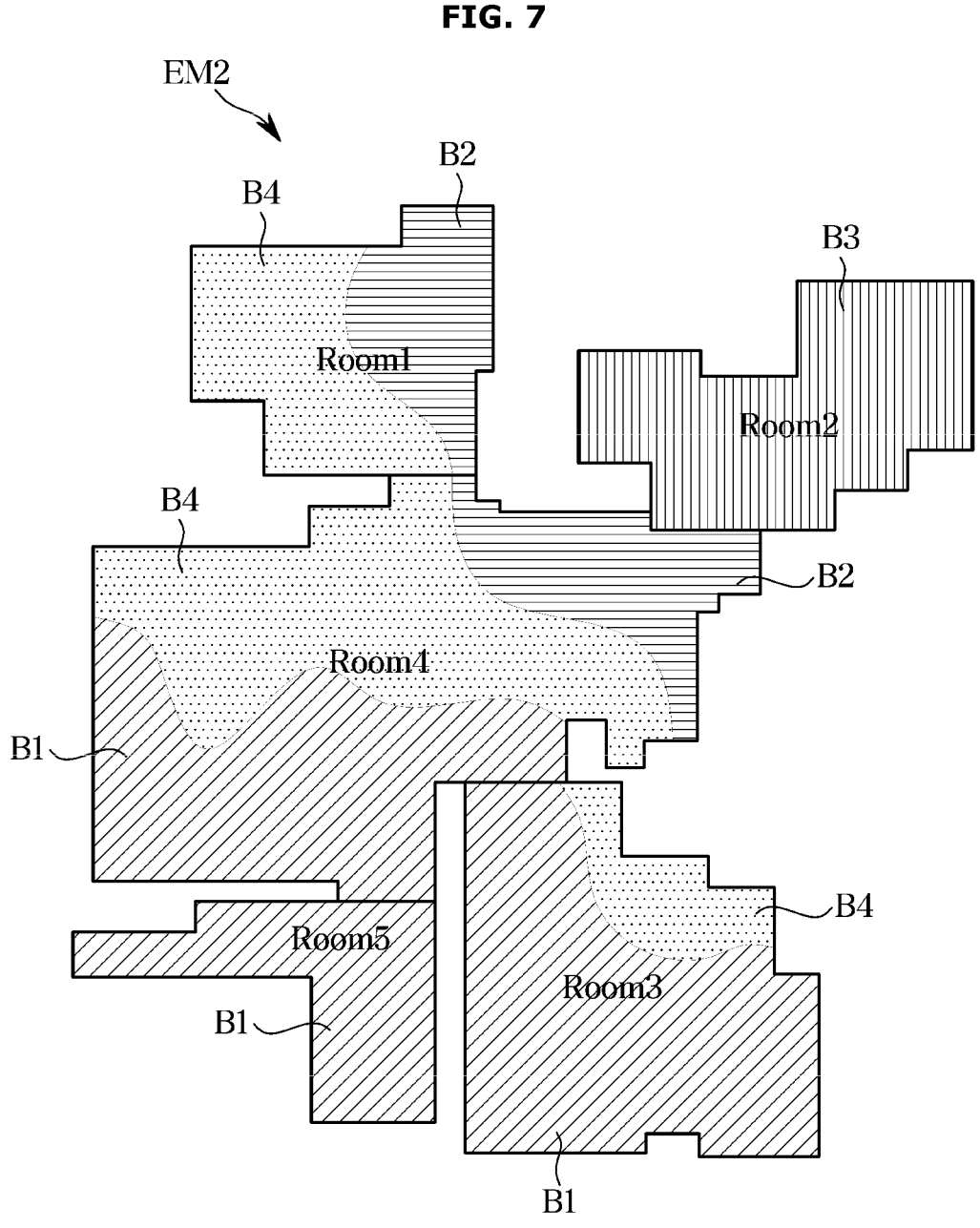
FIG. 7 illustrates an environment map generated by a mobile robot according to an embodiment of the disclosure.

FIG. 5 illustrates a map of an indoor space generated by a mobile robot according to an embodiment of the disclosure. FIG. 6 illustrates an environment map generated by a mobile robot according to an embodiment of the disclosure. FIG. 7 illustrates an environment map generated by a mobile robot according to an embodiment of the disclosure.

Referring to FIG. 5, the mobile robot 1 may generate a map of an indoor space while traveling in the indoor space. The mobile robot 1 may generate a reference map M of the indoor space including a plurality of zones, by using at least one of image data or lidar data obtained while traveling in the indoor space. It is illustrated in FIG. 5 that the indoor space is divided into five rooms. The indoor space may be divided into a Room 1, a Room 2, a Room 3, a Room 4, and a Room 5.

Environments of a first room (Room 1), a second room (Room 2), a third room (Room 3), a fourth room (Room 4), and a fifth room (Room 5) may be the same or different from each other. In other words, environmental information of each of the five rooms may be the same or different from each other. For example, a temperature, humidity, illuminance, and dust concentration measured in each of the five rooms may be the same or different.

The mobile robot 1 may obtain environmental information for each of the plurality of zones of the indoor space from the sensor 100. The mobile robot 1 may generate an environment map including the environmental information for each of the plurality of zones. The mobile robot 1 may generate different environment maps depending on types of environmental factors that determine an environment of each of the plurality of zones. The mobile robot 1 may generate the environment map by mapping the environmental information obtained in each of the rooms to the reference map M. Each of the rooms may be divided into at least one zone according to the environmental information.

A first environment map EM1 shown in FIG. 6 may be exemplified as a temperature distribution map. An indoor space may be divided into a plurality of zones depending on temperature. For example, the indoor space may be divided into a first temperature zone A1 represented by a horizontal line pattern, a second temperature zone A2 represented by a diagonal line pattern, a third temperature zone A3 represented by a vertical line pattern, and a fourth temperature zone represented by a dot pattern. A first temperature of the first temperature zone A1, a second temperature of the second temperature zone A2, a third temperature of the third temperature zone A3, and a fourth temperature of the fourth temperature zone A4 may be different from each other.

A second environment map EM2 shown in FIG. 7 may be exemplified as a humidity distribution map. An indoor space may be divided into a plurality of zones depending on humidity. For example, the indoor space may be divided into a first humidity zone B1 represented by a diagonal line pattern, a second humidity zone B2 represented by a horizontal line pattern, a third humidity zone B3 represented by a vertical line pattern, and a fourth humidity zone B4 represented by a dot pattern. A first humidity of the first humidity zone B1, a second humidity of the second humidity zone B2, a third humidity of the third humidity zone B3, and a fourth humidity of the fourth humidity zone B4 may be different from each other.

The first environment map EM1 in FIG. 6 and the second environment map EM2 in FIG. 7 are not limited to the temperature distribution map and the humidity distribution map, respectively. Each of the first environment map EM1 and the second environment map EM2 may be a variety of maps, such as an illuminance distribution map, a dust distribution map, a gas map, an air flow map, a color map, a color temperature map, or a Wi-Fi signal map.

Figure 8:
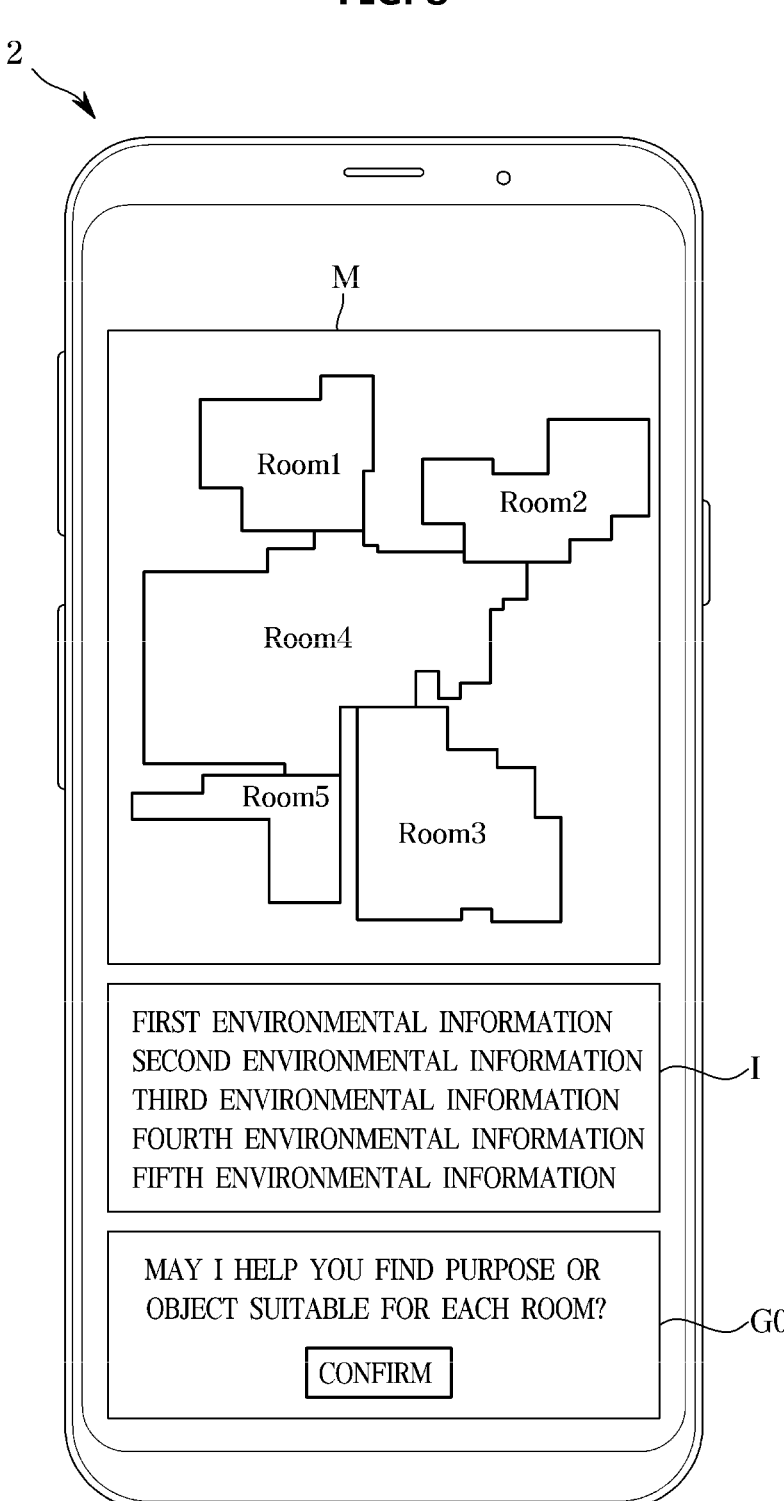
FIG. 8 illustrates an image displayed on a mobile robot or a user device to provide environmental information about a plurality of zones of an indoor space generated by the mobile robot according to an embodiment of the disclosure.

FIG. 8 illustrates an image displayed on a mobile robot or a user device to provide environmental information about a plurality of zones of an indoor space generated by the mobile robot according to an embodiment of the disclosure.

Referring to FIG. 8, the mobile robot 1 may provide the user device 2 with an environment map including a plurality of zones of an indoor space and environmental information for each of the plurality of zones. The environment map of FIG. 8 may correspond to a reference map M. For example, the plurality of zones of the indoor space may include a first room (Room 1), a second room (Room 2), a third room (Room 3), a fourth room (Room 4), and a fifth room (Room 5).

The user device 2 may display the reference map including the first room (Room 1), the second room (Room 2), the third room (Room 3), the fourth room (Room 4), and the fifth room (Room 5). The user device 2 may display an information window 1 providing first environmental information of the first room (Room 1), second environmental information of the second room (Room 2), third environmental information of the third room (Room 3), fourth environmental information of the fourth room (Room 4), and fifth environmental information of the fifth room (Room 5).

The environmental information of each of the rooms may include at least one value of at least one environmental factor obtained by the sensor 100 of the mobile robot 1. For example, the environmental information of each of the rooms may include a value of at least one of various environmental factors, such as a temperature, humidity, illuminance, and dust concentration.

In addition, the user device 2 may display a message window G0 including a guide message to guide a user in setting a purpose of a room or selecting an object to be placed in a room. For example, a guide message, such as 'May I help you find a purpose or an object suitable for each room?' may be provided to guide a user in setting a purpose of a room or selecting an object to be placed in the room. When a user presses a 'confirm' button included in the message window G0, another image for setting a purpose of a room or selecting an object to be placed in the room may be displayed through the user device 2.

The mobile robot 1 may determine a recommended purpose and/or recommended object corresponding to the environmental information for each of the plurality of rooms. Instead of the image for setting a purpose of a room or selecting an object to be placed in the room, an image for providing information about the recommended purpose and/or recommended object corresponding to the environmental information of each of the rooms may be displayed through the user device 2 or the display 62 of the mobile robot 1.

For example, the mobile robot 1 may recommend a purpose of the first room (Room 1) as a study room or a kid's study room based on the first environmental information (e.g., illuminance, humidity, temperature, color temperature, noise, or the like) of the first room (Room 1). The mobile robot 1 may recommend a purpose of the second room (Room 2) as a baby room based on the second environmental information (e.g., temperature, humidity, air quality, or the like) of the second room (Room 2). The mobile robot 1 may recommend a purpose of the third room (Room 3) as a living room or bedroom based on the third environmental information (e.g., temperature, humidity, air quality, amount of sunshine, noise, or the like) of the third room (Room 3). The mobile robot 1 may recommend a purpose of the fourth room (Room 4) as a laundry drying room or a plant room based on the fourth environmental information (e.g., humidity, amount of sunshine, or the like) of the fourth room (Room 4). The mobile robot 1 may recommend a purpose of the fifth room (Room 5) as a musical instrument room based on the fifth environmental information (e.g., temperature, humidity, or the like) of the fifth room (Room 5).

In another example, the mobile robot 1 may recommend an arrangement of furniture or books in the first room (Room 1) based on the first environmental information (e.g., illuminance, humidity, temperature, color temperature, noise, or the like) of the first room (Room 1). The mobile robot 1 may recommend an arrangement of a baby bed in the second room (Room 2) based on the second environmental information (e.g., temperature, humidity, air quality, or the like) of the second room (Room 2). The mobile robot 1 may recommend an arrangement of a couch or bed in the third room (Room 3) based on the third environmental information (e.g., temperature, humidity, air quality, amount of sunshine, noise, or the like) of the third room (Room 3). The mobile robot 1 may recommend an arrangement of a clothes drying rack, flowerpot, or solar charger in the fourth room (Room 4) based on the fourth environmental information (e.g., humidity, amount of sunshine, or the like) of the fourth room (Room 4). The mobile robot 1 may recommend an arrangement of musical instruments in the fifth room (Room 5) based on the fifth environmental information (e.g., temperature, humidity, or the like) of the fifth room (Room 5).

Figure 9:
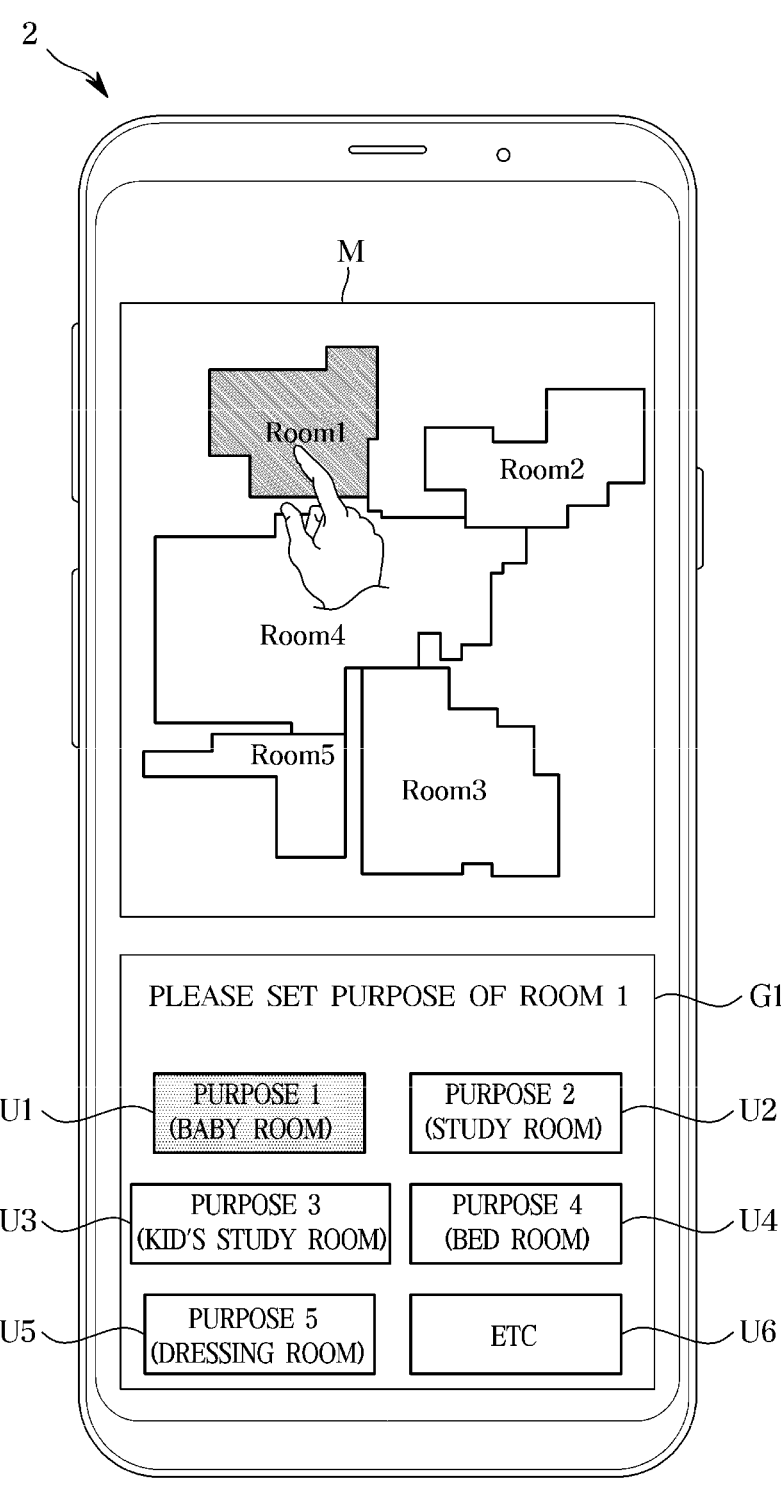
FIG. 9 illustrates an image displayed on a mobile robot or a user device to guide purpose settings for a specific zone using an environment map generated by the mobile robot according to an embodiment of the disclosure.

FIG. 9 illustrates an image displayed on a mobile robot or a user device to guide purpose settings for a specific zone using an environment map generated by the mobile robot according to an embodiment of the disclosure.

Referring to FIG. 9, the mobile robot 1 may obtain, from the user device 2, a user input to select the first room (Room 1) from the plurality of zones displayed on the reference map M. In response to the first room (Room 1) being selected, the user device 2 may display a first guide window G1 to guide setting of a purpose of the first room (Room 1).

A plurality of purpose buttons indicating a plurality of purposes may be displayed in the first guide window G1. For example, in the first guide window G1, displayed are a first purpose button U1 exemplified as a baby room, a second purpose button U2 exemplified as a study room, a third purpose button U3 exemplified as a kid's study room, a fourth purpose button U4 exemplified as a bedroom, a fifth purpose button U5 exemplified as a dressing room, and a sixth purpose button U6 for indicating other purposes.

The mobile robot 1 may set a purpose of the first room (Room 1), based on one of the plurality of purpose buttons being pressed or touched. In response to the first purpose button U1 being pressed or touched, the purpose of the first room (Room 1) may be set to the first purpose. In response to the second purpose button U2 being pressed or touched, the purpose of the first room (Room 1) may be set to the second purpose. In response to the third purpose button U3 being pressed or touched, the purpose of the first room (Room 1) may be set to the third purpose. In response to the fourth purpose button U4 being pressed or touched, the purpose of the first room (Room 1) may be set to the fourth purpose. In response to the fifth purpose button U5 being pressed or touched, the purpose of the first room (Room 1) may be set to the fifth purpose. In response to the sixth purpose button U6 being pressed or touched, another button for another purpose may be displayed, or an input window through which a user may directly input a purpose of the first room (Room 1) may be displayed.

In response to the purpose of the first room (Room 1) being set, the mobile robot 1 may obtain required environmental information corresponding to the set purpose from the memory 220 or the server 3. For example, in response to the purpose of the first room (Room 1) being set to the first purpose, the mobile robot 1 may obtain first required environmental information corresponding to the first purpose from the memory 220 or the server 3.

The image displayed through the user device 2 in FIG. 9 may also be displayed on the display 62 of the mobile robot 1.

Figure 10:
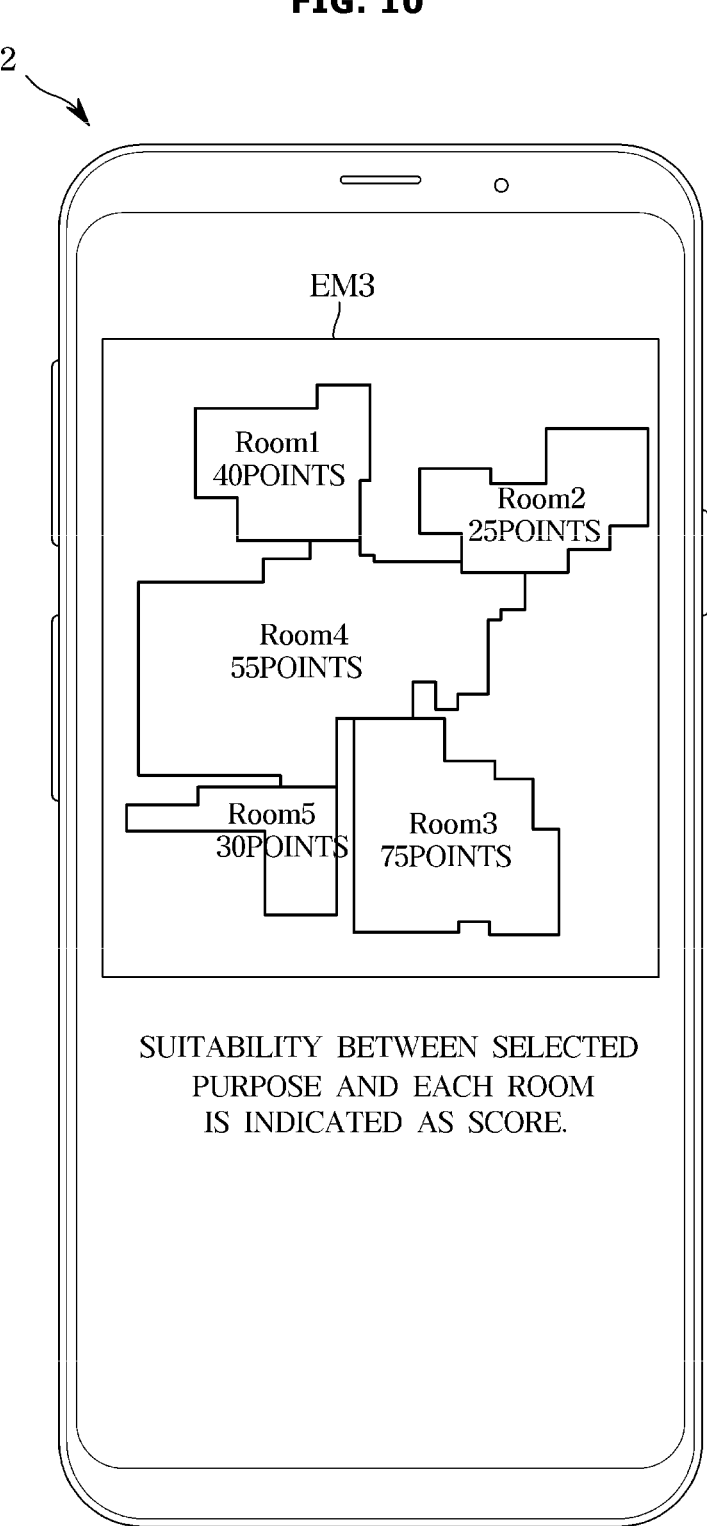
FIG. 10 illustrates an image displayed on a mobile robot or a user device to provide a suitability between a plurality of zones of an indoor space and a purpose selected by a user according to an embodiment of the disclosure.

FIG. 10 illustrates an image displayed on a mobile robot or a user device to provide a suitability between a plurality of zones of an indoor space and a purpose selected by a user according to an embodiment of the disclosure.

Referring to FIG. 10, the mobile robot 1 may compare current environmental information of a specific zone with required environmental information corresponding to a purpose of the specific zone set according to a user input. The mobile robot 1 may determine a suitability between the set purpose and the specific zone based on the required environmental information corresponding to the set purpose and the current environmental information of the specific zone.

For example, the mobile robot 1 may determine a suitability between the first purpose and the first room (Room 1), based on required environmental information corresponding to the first purpose set for the first room (Room 1) and current environmental information of the first room (Room 1). In addition to the suitability between the first purpose and the first room, the mobile robot 1 may determine a suitability between the first purpose and the second room (Room 2), a suitability between the first purpose and the third room (Room 3), a suitability between the first purpose and the fourth room (Room 4) and a suitability between the first purpose and the fifth room (Room 5).

The mobile robot 1 may generate a third environment map EM3 including the suitability between each of the rooms and the first purpose, and may provide the third environment map EM3 to the user device 2. The user device 2 may display the third environment map EM3. The third environment map EM3 may be referred to as a 'suitability map'.

The suitability between each of the rooms and the first purpose may be provided as a score (point) or index. Referring to FIG. 10, the suitability between the first purpose and the first room (Room 1) may be displayed as 40 points, the suitability between the first purpose and the second room (Room 2) may be displayed as 25 points, the suitability between the first purpose and the third room (Room 3) may be displayed as 75 points, the suitability between the first purpose and the fourth room (Room 4) may be displayed as 55 points, and the suitability between the first purpose and the fifth room (Room 5) may be displayed as 30 points.

Referring to FIG. 10, information displayed through the user device 2 may also be displayed on the display 62 of the mobile robot 1.

Through the third environment map EM3 displayed on the user device 2, a user may easily see that the first room (Room 1) is not suitable for the first purpose. However, the user may desire to change an environment of the first room (Room 1) in order to use the first room (Room 1) for the first purpose.

Figure 11:
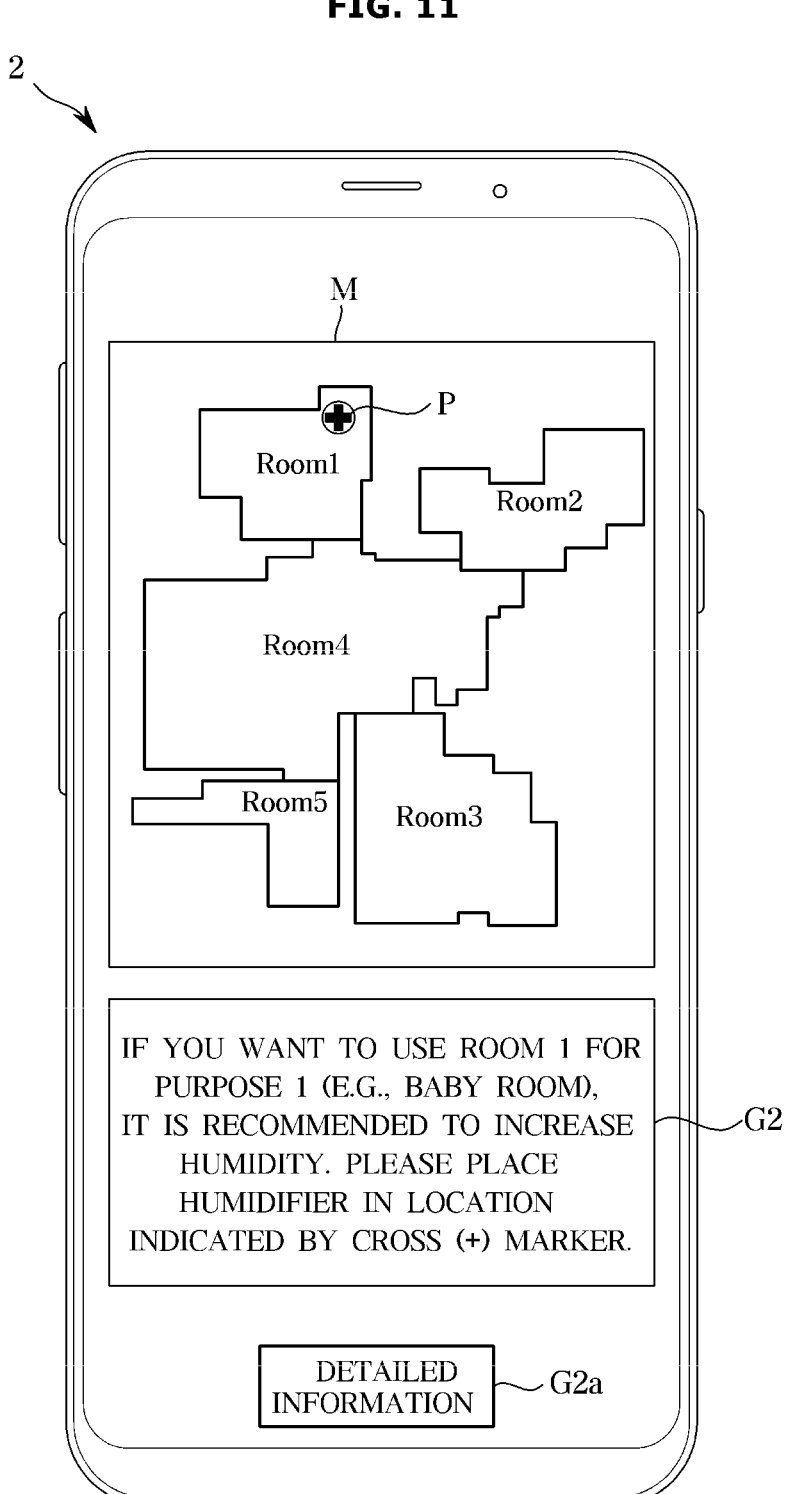
FIG. 11 illustrates an image displayed on a mobile robot or a user device to recommend a target device to be placed in a specific zone of an indoor space according to an embodiment of the disclosure.
Figure 12:
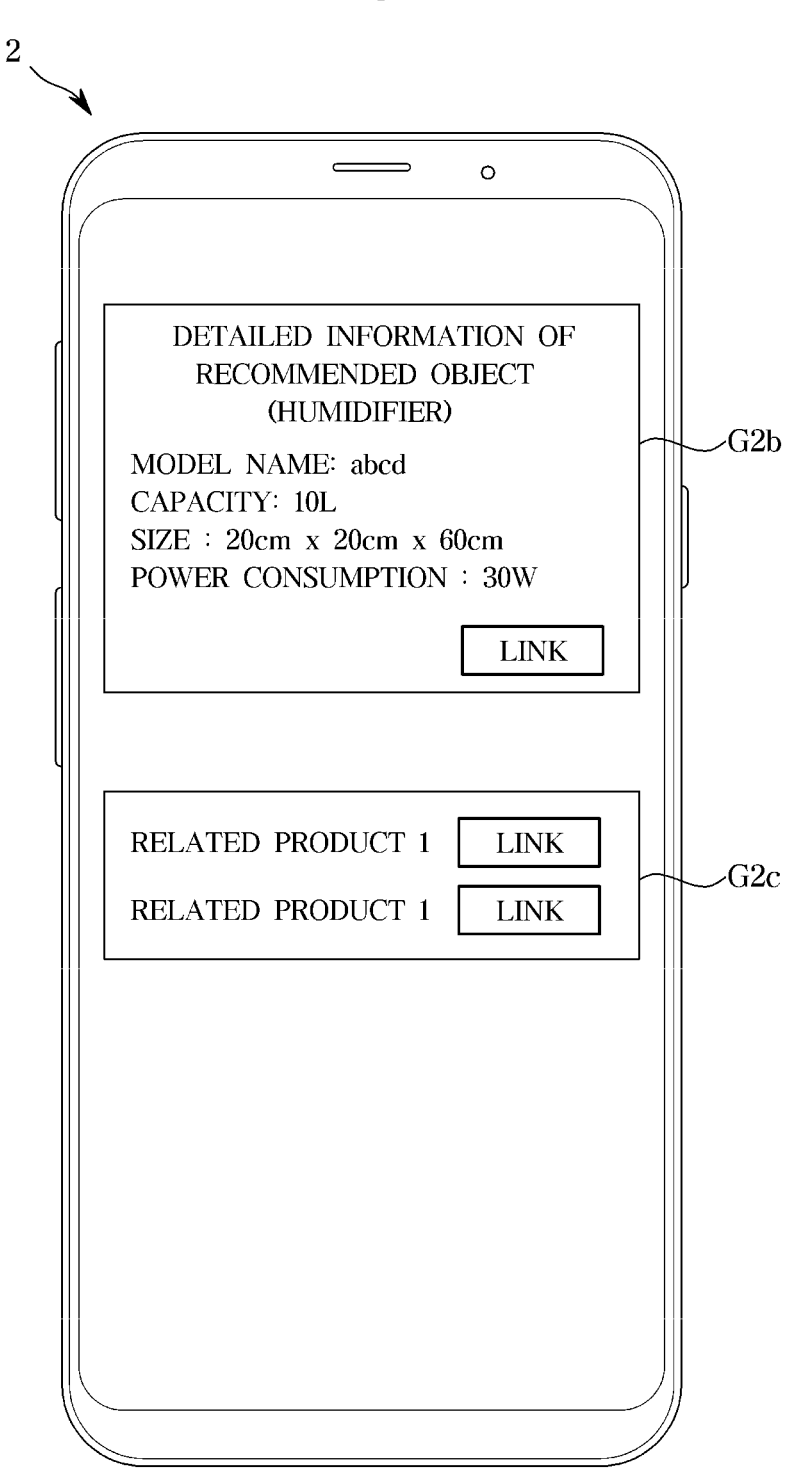
FIG. 12 illustrates an image to provide detailed information of a recommended target device according to an embodiment of the disclosure.

FIG. 11 illustrates an image displayed on a mobile robot or a user device to recommend a target device to be placed in a specific zone of an indoor space according to an embodiment of the disclosure. FIG. 12 illustrates an image to provide detailed information of a recommended target device according to an embodiment of the disclosure.

Referring to FIG. 10, because the suitability between the first room (Room 1) and the first purpose is relatively low, it may be unsuitable to use the first room (Room 1) for the first purpose. However, by placing a suitable home appliance 10 in the first room (Room 1), an environment of the first room (Room 1) may be changed to be suitable for the first purpose.

Referring to FIG. 11, the mobile robot 1 may generate recommendation information for recommending a target device to be placed in a specific zone according to a suitability between a set purpose and the specific zone, and may provide the recommendation information to the user device 2. The recommendation information may include an optimal location P of the target device. Referring to FIG. 11, the set purpose is exemplified as the first purpose, the specific zone is exemplified as the first room (Room 1), and the target device is exemplified as a humidifier.

The mobile robot 1 may determine the optimal location P of the humidifier in the first room (Room 1) in order to optimize the suitability between the set first purpose and the first room (Room 1). The optimal location of the humidifier P may be displayed on the reference map M. The optimal location P of the humidifier may be displayed on the third environment map EM3 of FIG. 10. The optimal location P may be determined by further considering various objects (e.g., desks, beds, bookshelves, closets, other home appliances, or the like) present in the first room (Room 1). The mobile robot 1 may estimate a location where a user may stay when using the first room for the set purpose based on the locations of objects present in the first room (Room 1).

The user device 2 may display a second guide window G2 including recommendation information. For example, the recommendation information displayed in the second guide window (G2) may be provided as a text message, such as 'If you want to use the Room 1 for the purpose 1 (e.g., a baby room), it is recommended to increase the humidity. Please place a humidifier in the location indicated by a cross (+) marker.' Referring to FIG. 12, the recommendation information may include not only a type of target device (e.g., humidifier) and the optimal location of target device, but also information G2b about the target device, such as a model name, capacity, size, and power consumption of the target device. When a user clicks or touches the information button G2a shown in FIG. 11, the image shown in FIG. 12 may be displayed. In addition, the information G2b may include a link connected to purchase information of the target device. Furthermore, the recommendation information may include a related product list G2c for recommending products associated with the target device. The related product list G2c may include an Internet link to specification information and purchase information of each related product.

The mobile robot 1 may identify that the target device (e.g., humidifier) is placed in the specific zone (e.g., first room). Based on the target device being placed in the specific zone, the mobile robot 1 may control an operation of the target device to allow a suitability between the set purpose (e.g., first purpose) and the specific zone (e.g., first room) to reach a predetermined optimal index. The mobile robot 1 may increase the humidity of the first room by operating the humidifier placed in the first room. Accordingly, the suitability between the first room and the first purpose may be increased.

In addition, in a case where another controllable home appliance 10 other than the target device exists in the specific zone (e.g., first room), the mobile robot 1 may control an operation of the other home appliance 10 to change an environment of the specific zone (e.g., first room) to the set purpose. For example, in a case where a temperature of the first room is required to be controlled to use the first room for the first purpose, an operation of an air conditioner in the first room may be controlled.

The mobile robot 1 may control the user device 2 to output a location movement notification, based on the target device being placed in an arbitrary location different from the optimal location in the specific zone. The location movement notification may be provided through the user interface 60 or speaker 80 of the mobile robot 1.

The information displayed through the user device 2 in FIGS. 11 and 12 may also be displayed on the display 62 of the mobile robot 1.

Figure 13:
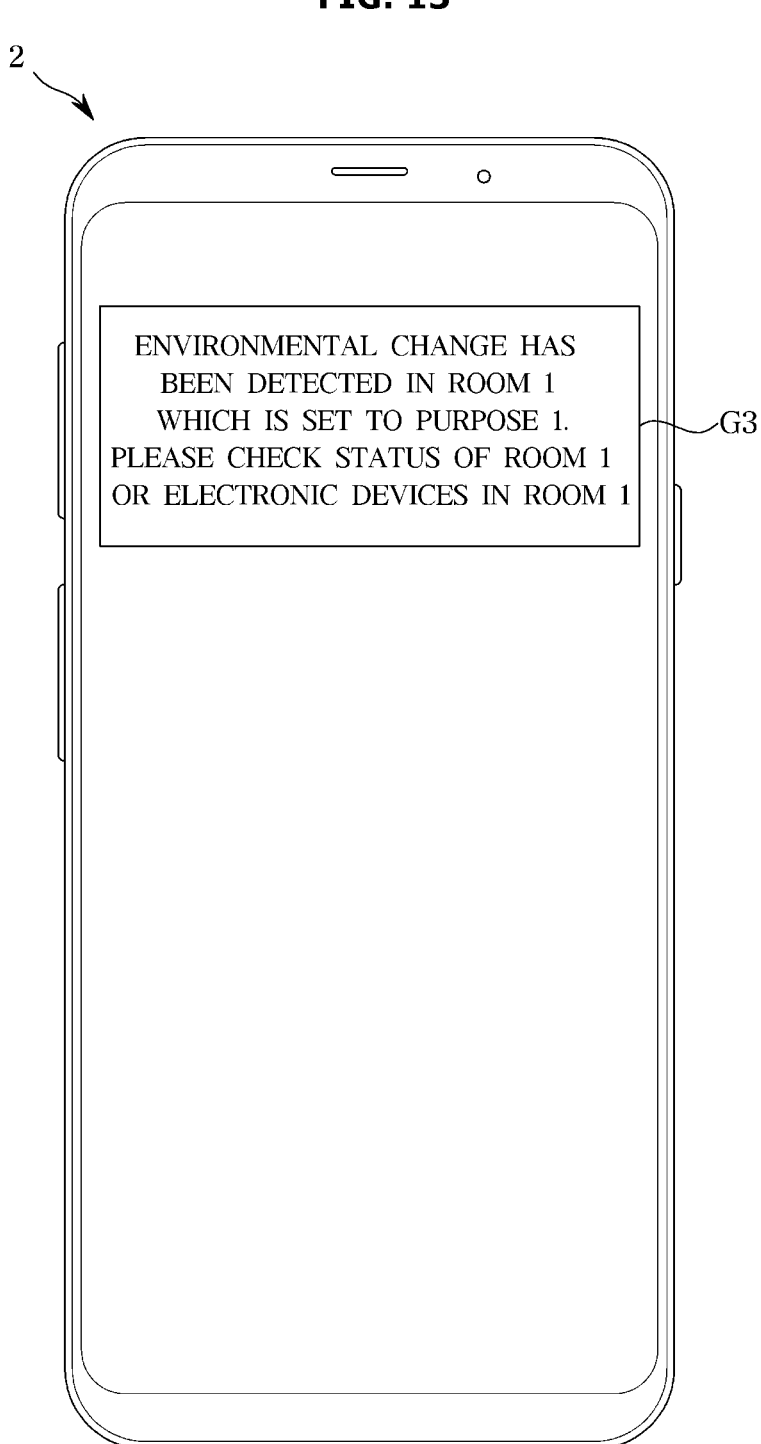
FIG. 13 illustrates an image displayed on a mobile robot or a user device to notify an event in which environmental information changes in a specific zone of an indoor space according to an embodiment of the disclosure.

FIG. 13 illustrates an image displayed on a mobile robot or a user device to notify an event in which environmental information changes in a specific zone of an indoor space according to an embodiment of the disclosure.

Referring to FIG. 13, the mobile robot 1 may detect an event in which environmental information of a specific zone changes after a suitability between a set purpose and the specific zone reaches a predetermined optimal index. In other words, the mobile robot 1 may monitor whether an environment in the specific zone is maintained for the set purpose. The mobile robot 1 may monitor whether a value or numerical value representing environmental information in the specific zone is outside a range determined by the set purpose. In addition, the mobile robot 1 may learn a range of changes in environmental information based on a user's response to the occurrence of event. The mobile robot 1 may provide the user device 2 with event information including the environmental change information of the specific zone and information about an abnormal operation of the target device.

The user device 2 may display a third guide window G3 including the event information received from the mobile robot 1. For example, the event information may be provided as a text message, such as 'an environmental change has been detected in Room 1 which is set to the purpose 1. Please check the status of Room 1 or the electronic devices in Room 1.' A user may recognize a problem that has occurred in Room 1 from the event information, and may easily find a solution.

Based on an event being identified in the indoor space in a state where a user is not in the indoor space, the mobile robot 1 may provide event information to the user device 2. By providing the event information to the user when the user is not in the indoor space, the user may recognize the environmental change in the indoor space. The event information may be provided through the user device 2 or the mobile robot 1 even when the user is in the indoor space.

For example, in response to an event in which a humidity of the first room changes for some reason (e.g., malfunction of a humidifier and/or open window) while a user is not in the indoor space, the mobile robot 1 may provide the user device 2 with event information about the humidity change. The mobile robot 1 may control an operation of the humidifier placed in the first room to maintain the humidity of the first room at a humidity suitable for a set purpose.

In another example, in response to an event in which an illuminance of the first room changes for some reason (e.g., malfunction of a lighting device and/or open curtain) while a user is not in the indoor space, the mobile robot 1 may provide the user device 2 with event information about the illuminance change in the first room. The mobile robot 1 may control an operation of lighting device placed in the first room to maintain the illuminance of the first room at a level suitable for a set purpose.

In still another example, in response to an event in which a temperature of the first room changes for some reason (e.g., malfunction of air conditioner and/or open window) while a user is not in the indoor space, the mobile robot 1 may provide the user device 2 with event information about the temperature change in the first room. The mobile robot 1 may control an operation of the air conditioner placed in the first room to maintain the temperature of the first room at a temperature suitable for a set purpose.

The information displayed through the user device 2 in FIG. 13 may also be displayed on the display 62 of the mobile robot 1.

Figure 14:
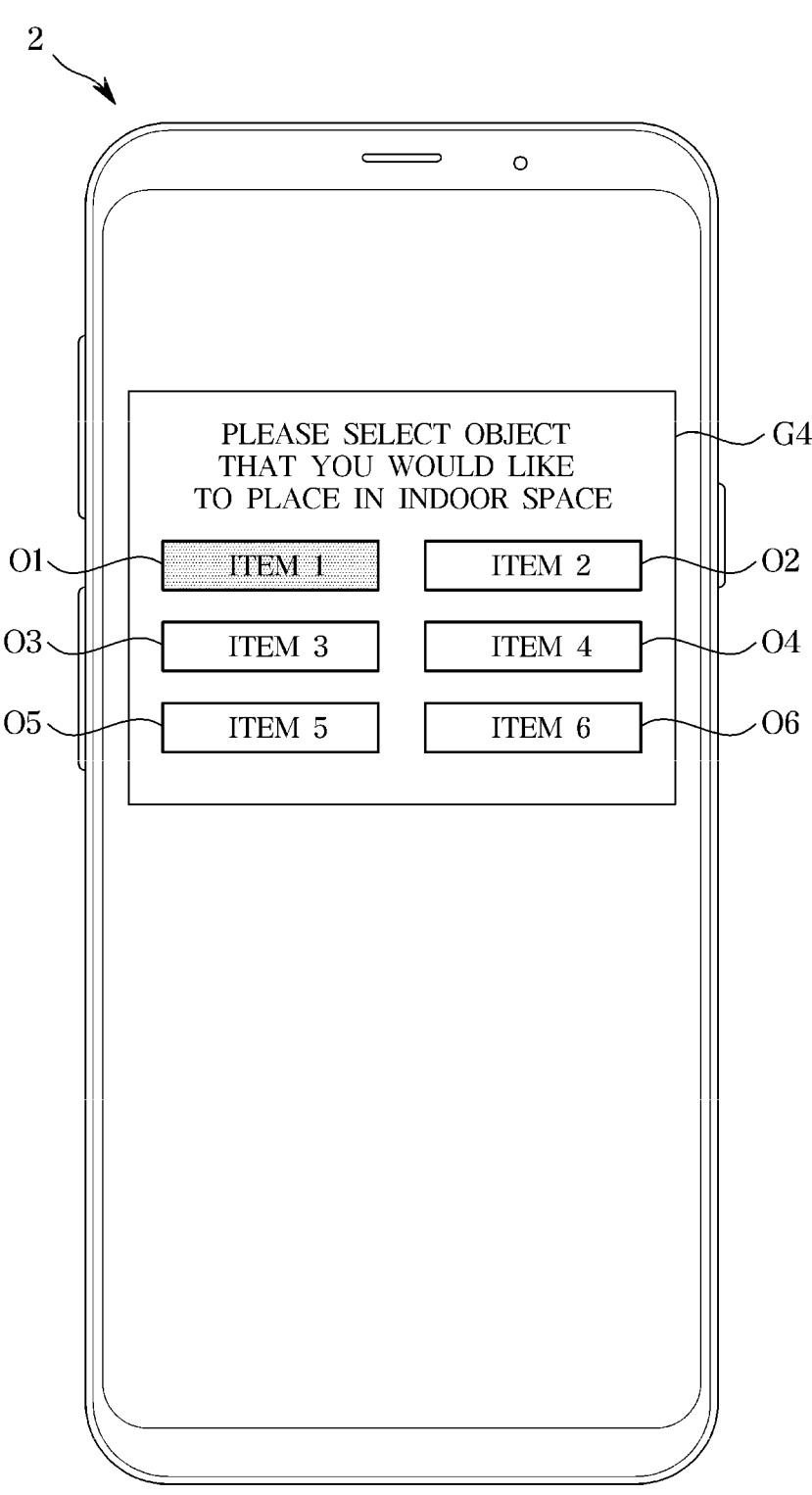
FIG. 14 illustrates an image displayed on a mobile robot or a user device to guide selection of an object to be placed in an indoor space according to an embodiment of the disclosure.
Figure 15:
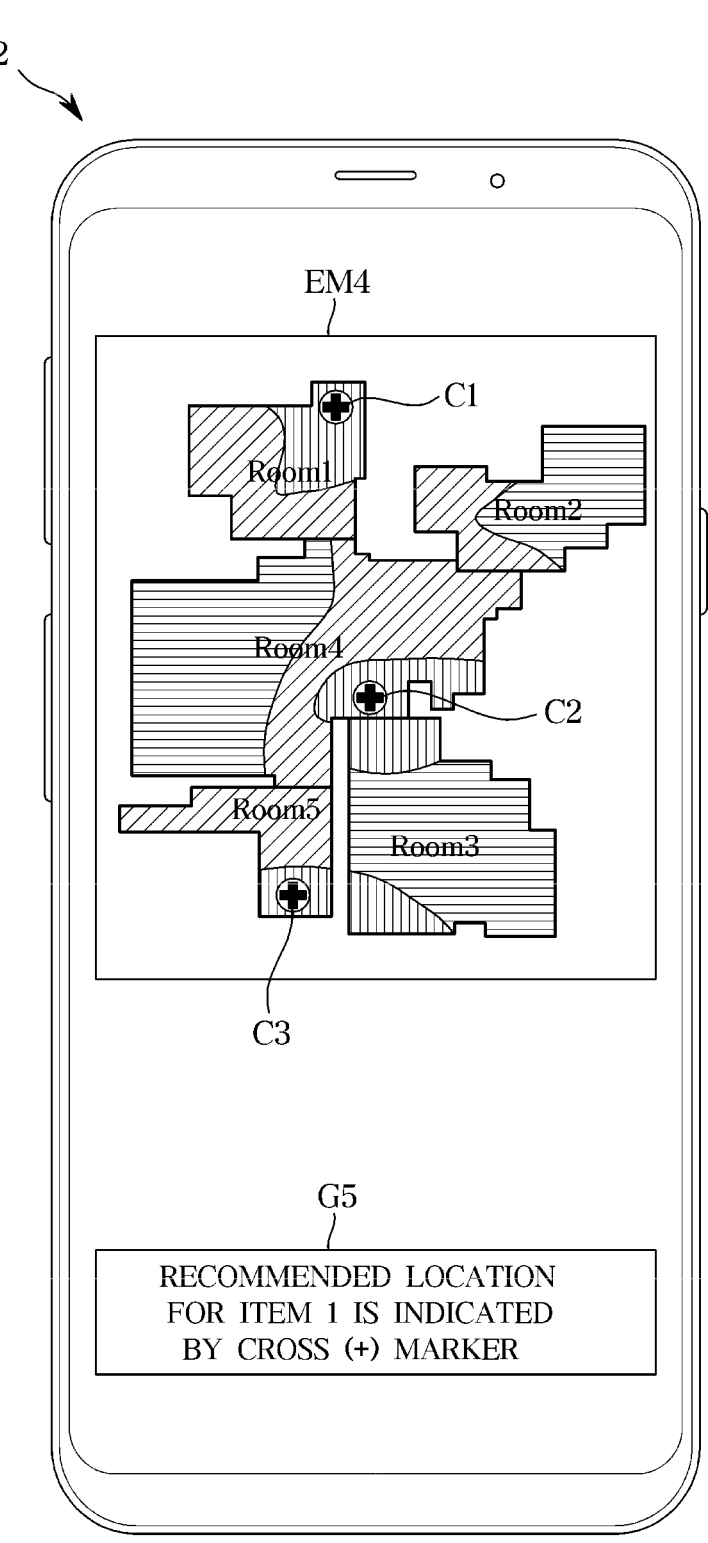
FIG. 15 illustrates an image displayed on a mobile robot or a user device to recommend a location where an object selected in FIG. 14 will be placed according to an embodiment of the disclosure.

FIG. 14 illustrates an image displayed on a mobile robot or a user device to guide selection of an object to be placed in an indoor space according to an embodiment of the disclosure. FIG. 15 illustrates an image displayed on a mobile robot or a user device to recommend a location where the object selected in FIG. 14 will be placed according to an embodiment of the disclosure.

The information displayed through the user device 2 in FIGS. 14 and 15 may also be displayed on the display 62 of the mobile robot 1.

The embodiment described in FIG. 14 may be continued from the description of FIG. 8. As described in FIG. 8, the guide message that guides selection of an object to be placed in the indoor space may be displayed through the user device 2 or the display 62 of the mobile robot 1. In addition, based on the 'confirmation' input for the guide message, the user device 2 may display a fourth guide window G4 including a plurality of item buttons representing a plurality of objects.

For example, in the fourth guide window G4, displayed are a first item button O1 indicating a first object (Item 1), a second item button O2 indicating a second object (Item 2), a third item button O3 indicating a third object (Item 3), a fourth item button O4 indicating a fourth object (Item 4), a fifth item button O5 indicating a fifth object (Item 5), and another item button O6 indicating another object (Item 6). The mobile robot 1 may select an object to be placed in the indoor space, based on one of the plurality of item buttons being pressed or touched.

Referring to FIG. 15, in response to the first item button O1 being pressed or touched, the mobile robot 1 may determine at least one recommended zone or at least one recommended location suitable for placing the first object in the indoor space. The mobile robot 1 may obtain required environmental information corresponding to the selected first object from the memory 220 or the server 3. The mobile robot 1 may determine a suitability between the required environmental information about the selected first object and each of the plurality of zones of the indoor space. The mobile robot 1 may determine the suitability between the first object and each of the plurality of zones based on the required environmental information corresponding to the first object and environmental information of each of the plurality of zones.

The mobile robot 1 may compare the required environmental information about the first object with the environmental information of each of the plurality of zones. The suitability may be determined differently depending on a difference between the required environmental information about the first object and the environmental information of each of the plurality of zones. The mobile robot 1 may determine a zone with a relatively high suitability with the first object from among the plurality of zones in the indoor space, as a recommended zone suitable for placing the first object. In addition, the mobile robot 1 may determine a recommended location most suitable for placing the first object in the recommended zone. The recommended location may be determined by further considering various objects (e.g., desks, beds, bookshelves, closets, other home appliances, or the like) present in the indoor space. The recommended zone or recommended location for placement of the first object may be displayed on an environment map including the plurality of zones and environmental information of each of the zones. For example, a fourth environment map EM4 shown in FIG. 15 may be an illuminance distribution map. As described above, the mobile robot 1 may collect illuminance data through the sensor 100 while traveling in the indoor space, and may generate the illuminance distribution map of the indoor space by mapping the collected illuminance data to the reference map M including an indoor structure. The mobile robot 1 may transmit the illuminance distribution map to the user device 2, and the user device 2 may display the illuminance distribution map.

The first object may be a display device, such as a television. Required environmental information about the display device may include a predetermined required illuminance suitable for the display device. It is preferable to place the display device in an area or location with relatively low illuminance. The mobile robot 1 may determine at least one recommended zone or at least one recommended location for placement of the display device based on the required illuminance for the display device and the illuminance of each of the plurality of zones.

It is exemplified in FIG. 15 that three recommended locations (C1, C2 and C3) for placement of the first object are displayed on the fourth environment map EM4. A user may easily see that the first recommended location C1 in the first room (Room 1), the second recommended location C2 in the fourth room (Room 4), and the third recommended location C3 in the fifth room (Room 5) are suitable for placing the display device.

In addition, the mobile robot 1 may provide the user device 2 with recommendation information including the recommended zone or recommended location for placement of the first object. The user device 2 may display a fifth guide window G5 including the recommendation information. For example, the recommendation information displayed in the fifth guide window G5 may be provided as a text message, such as 'the recommended location for the item 1 is indicated by a cross (+) marker.'

The mobile robot 1 may control the user device 2 to output a location movement notification, based on the first object being placed in an arbitrary location different from the recommended zone or the recommended location. The location movement notification may be provided through the user interface 60 or speaker 80 of the mobile robot 1.

The mobile robot 1 may detect an event in which an environment of the recommended zone changes after the first object is placed in the recommended zone. For example, after the display device is placed at the first recommended location C1, an event in which an illuminance detected at the first recommended location C1 changes for various reasons may occur. The mobile robot 1 may generate event information including environmental change information of the recommended zone, and may provide the event information to the user device 2.

In a case where the first object is a controllable electronic device, the mobile robot 1 may control an operation of the first object in response to an environmental change in the recommended zone. For example, based on an increase in illuminance of the first recommended location C1, the mobile robot 1 may control the display device to increase a brightness of an image that is output from the display device. In contrast, based on a decrease in illuminance of the first recommended location C1, the mobile robot 1 may control the display device to decrease a brightness of an image that is output from the display device. In a case where the illuminance of the first recommended location C1 increases due to sunlight entering the first room, the mobile robot 1 may control an electric curtain to cover a window of the first room.

The mobile robot 1 may recommend another device to change an environment of a recommended zone where the first object will be placed, or may control an operation of the other device in the recommended zone according to characteristics of the first object.

In another example, an object to be placed in an indoor space may be clothing or food that requires to be dried. The mobile robot 1 may recommend placing the clothing or food in an area with a relatively high illuminance and a high temperature in the indoor space. In a case where an object to be placed in the indoor space is a solar charger, the mobile robot 1 may recommend placing the solar charger in an area with a relatively high illuminance in the indoor space. The mobile robot 1 may obtain health information of a user from the user device 2, and may recommend a suitable place for the user to relax in the indoor space based on the user's health information.

An object to be placed in the indoor space may be a plant. The mobile robot 1 may recommend a zone or location suitable for placing the plant in the indoor space, based on a type of plant and environmental information of the indoor space. The mobile robot 1 may provide the user device 2 with a notification regarding a location change of the plant placement based on at least one of a predetermined growth schedule of the plant or an environmental change in the place where the plant is placed.

In addition, the mobile robot 1 may control an operation of home appliance that may affect the environment where the plant is placed, based on at least one of the predetermined growth schedule of the plant or the environmental change in the place where the plant is placed. The plant's growth schedule may be obtained from the memory 220 or the server 3. For example, in order to control a temperature and humidity of the place where the plant is placed, the mobile robot 1 may control an operation of an air conditioner.

The mobile robot 1 may further include at least one of a robot arm for relocating a plant or a plant waterer for supplying water to the plant. The mobile robot 1 may relocate the plant using the robot arm. The mobile robot 1 may control the plant waterer to supply water to the plant according to a condition of the plant. The mobile robot 1 may also clean dirt and water that falls after moving the plant.

FIG. 16 is a flowchart illustrating a method for controlling a mobile robot according to an embodiment of the disclosure. FIG. 17 is a flowchart illustrating a method for controlling a mobile robot after placing a target device recommended in FIG. 16 according to an embodiment of the disclosure.

Referring to FIG. 16, the controller 200 of the mobile robot 1 may collect environmental information of an indoor space through the sensor 100, while traveling in the indoor space at operation 1501. The controller 200 of the mobile robot 1 may generate a reference map including structural features of the indoor space using at least one of image data or lidar data obtained through the sensor 100. In addition, the controller 200 of the mobile robot 1 may generate an environment map including environmental information of each of a plurality of zones of the indoor space by mapping the environmental information to the reference map. The controller 200 of the mobile robot 1 may display the environment map through the display 62 or on the user device 2 at operation 1502.

The controller 200 of the mobile robot 1 may select a specific zone from the plurality of zones of the indoor space through the user interface 60 or the user device 2, and may obtain a user input for setting a purpose of the specific zone at operation 1503. Displaying the environment map and obtaining the user input may be performed while an application or program for providing recommendation information to a user is executed.

The controller 200 of the mobile robot 1 may determine a suitability between the set purpose and the specific zone at operation 1504. The mobile robot 1 may recommend a target device to be placed in the specific zone according to the suitability between the set purpose and the specific zone at operation 1505. The controller 200 of the mobile robot 1 may generate target device information and recommendation information for recommending an optimal location of the target device. To determine the optimal location of the target device, the controller 200 of the mobile robot 1 may further consider types, sizes, and locations of various objects (e.g., desks, beds, bookshelves, closets, other home appliances, or the like) present in the specific zone. The mobile robot 1 may estimate a location where the user may stay when using the specific zone for the set purpose, based on the locations of objects present in the specific zone.

The controller 200 may provide the user with the recommendation information through the display 62 or speaker 80. In addition, the mobile robot 1 may provide the recommendation information to the user device 2.

Referring to FIG. 17, the controller 200 of the mobile robot 1 may identify that the target device is placed in the specific zone, based on at least one of the image data obtained by the camera 110 or the lidar data obtained by the lidar sensor 120 at operation 1601. The controller 200 may also identify that the target device is placed in the specific zone by detecting a signal (e.g., Bluetooth low energy (BLE) signal, wi-fi signal, radio frequency (RF) signal, or the like) transmitted by the target device. A method for identifying that the target device is placed is not limited thereto.

The controller 200 may provide a location movement notification to the user device 2, based on the target device being placed in an arbitrary location different from the optimal location in the specific zone at operations 1602 and 1603. The location movement notification may be provided through the user interface 60 or speaker 80 of the mobile robot 1.

Based on the target device being placed in the specific zone, the controller 200 of the mobile robot 1 may control an operation of the target device to allow the suitability between the set purpose and the specific zone to reach a predetermined optimal index at operations 1602 and 1604.

The controller 200 may identify an event in which an environment of the specific zone is changed after the suitability between the set purpose and the specific zone reaches the predetermined optimal index at operation 1605. The controller 200 may notify the occurrence of the event regarding the environmental change in the specific zone through at least one of the user device 2, the user interface 60 of the mobile robot 1, or the speaker 80 of the mobile robot 1 at operation 1606. In other words, the mobile robot 1 may monitor whether the environment of the specific zone is maintained for its purpose. The mobile robot 1 may monitor whether a value or numerical value representing environmental information of the specific zone is outside a range determined by the set purpose. In addition, the mobile robot 1 may learn a range of changes in environmental information based on a user's response to the occurrence of the event. The controller 200 of the mobile robot 1 may control an operation of at least one of the target device or another device located in the specific zone in response to the environmental change in the specific zone at operation 1607.

For example, in response to an event in which a humidity of a first room changes for some reason (e.g., malfunction of a humidifier and/or open window) while a user is not in the indoor space, the mobile robot 1 may provide the user device 2 with event information about the humidity change. The mobile robot 1 may control an operation of the humidifier placed in the first room to maintain the humidity of the first room at a humidity suitable for a set purpose.

In another example, in response to an event in which an illuminance of the first room changes for some reason (e.g., malfunction of a lighting device and/or open curtain) while a user is not in the indoor space, the mobile robot 1 may provide the user device 2 with event information about the illuminance change in the first room. The mobile robot 1 may control an operation of lighting device placed in the first room to maintain the illuminance of the first room at a level suitable for a set purpose.

In still another example, in response to an event in which a temperature of the first room changes for some reason (e.g., malfunction of air conditioner and/or open window) while a user is not in the indoor space, the mobile robot 1 may provide the user device 2 with event information about the temperature change in the first room. The mobile robot 1 may control an operation of the air conditioner placed in the first room to maintain the temperature of the first room at a temperature suitable for a set purpose.

Figure 18:
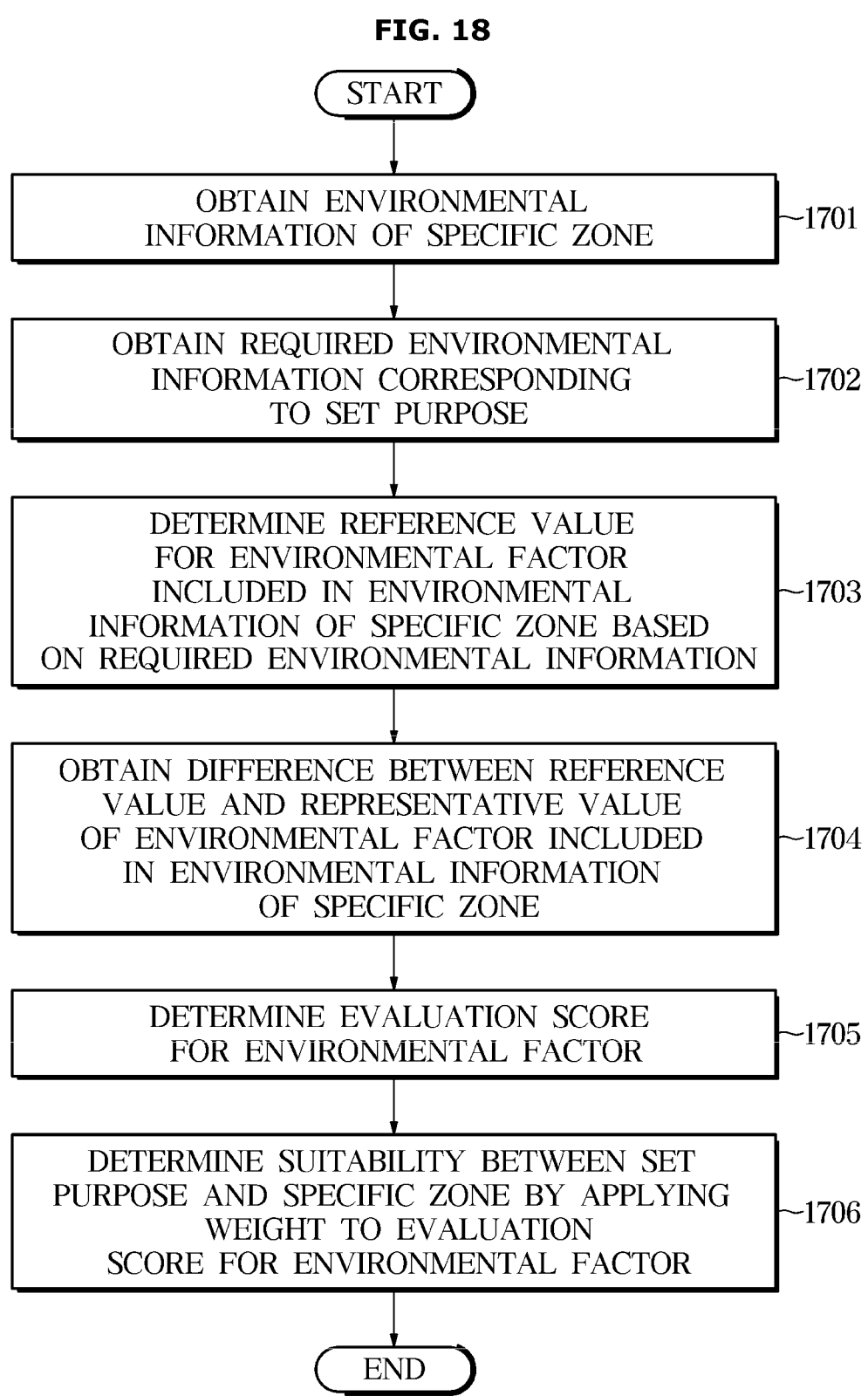
FIG. 18 is a flowchart illustrating a method of determining a suitability described in FIG. 16 according to an embodiment of the disclosure.

FIG. 18 is a flowchart illustrating a method of determining a suitability described in FIG. 16 according to an embodiment of the disclosure.

Referring to FIG. 18, the controller 200 of the mobile robot 1 may obtain environmental information of the specific zone selected according to the user input and required environmental information corresponding to the set purpose from the memory 220 or the server 3 at operations 1701 and 1702. The environmental information of the specific zone may include at least one environmental factor (e.g., temperature, humidity, illuminance, dust concentration) that determines an environment of the specific zone and a representative value of each of the at least one environmental factor. The representative value of each environmental factor is an index representing a current environment of specific zone, and may be an average or a median value of values measured at multiple locations in the specific zone. The representative value of each environmental factor may be an average or a median value of values measured at multiple times in the specific zone. For example, in a case where the environmental factor is temperature, an average or a median value of a plurality of temperature values obtained at different times in the specific zone may be determined as a representative value.

The controller 200 may determine a reference value for at least one environmental factor included in the environmental information of the specific zone, based on the required environmental information corresponding to the set purpose at operation 1703. The reference value refers to an optimal value of each environmental factor required to use a specific zone for a set purpose. The reference value of each environmental factor may vary depending on a set purpose. For example, the required environmental information may include at least one environmental factor required for a set purpose and an optimal value of each of the at least one environmental factor.

The controller 200 may determine a suitability based on a difference between a reference value and a representative value of at least one environmental factor included in the environmental information of the specific zone. The controller 200 may obtain the difference between the reference value and the representative value of each of the at least one environmental factor included in the environmental information of the specific zone at operation 1704. The controller 200 may determine the suitability to be higher, as the difference between the reference value and the representative value of at least one environmental factor is smaller. In contrast, the greater the difference between the required environmental information and current environmental information of the specific zone, the lower the suitability may be determined.

The controller 200 may determine an evaluation score for each of the at least one environmental factor based on the difference between the reference value and the representative value of each of the at least one environmental factor at operation 1705.

The controller 200 of the mobile robot 1 may determine a suitability between the set purpose and the specific zone by applying a weight to the evaluation score for each of the at least one environmental factor at operation 1706. The controller 200 may provide a weight, determined by required environmental information, to the evaluation score of each of the at least one environmental factor. The controller 200 may determine the suitability by summing the evaluation scores of each of the at least one weighted environmental factor.

In addition, the specific zone may be divided into a plurality of regions depending on environmental information. Each of the plurality of regions in the specific zone may have different environments due to various objects (e.g., desks, beds, bookshelves, closets, other home appliances, or the like) present in the specific zone. A plurality of regions with different values of environmental factors may exist even in the specific zone. The controller 200 may further consider types, sizes, and locations of various objects in the specific zone to determine the suitability between the set purpose and the specific zone.

FIG. 19 is a flowchart illustrating an embodiment that partially modifies a method for controlling a mobile robot described in FIGS. 16 and 17 according to an embodiment of the disclosure.

Referring to FIG. 19, the controller 200 of the mobile robot 1 may obtain environmental information of an indoor space through the sensor 100, while traveling in the indoor space at operation 1801. The controller 200 of the mobile robot 1 may generate an environment map including environmental information for a plurality of zones of the indoor space by mapping the environmental information to a reference map. The controller 200 of the mobile robot 1 may display the environment map through the display 62, or on the user device 2 at operation 1802.

The controller 200 of the mobile robot 1 may obtain a user input for selecting an object to be placed in the indoor space through the user interface 60 or the user device 2 at operation 1803. The controller 200 may obtain a user input for selecting an object to be placed in at least one of the plurality of zones included in the environment map through the user device 2 or the user interface 60. Displaying the environment map and obtaining the user input may be performed while an application or program for providing recommendation information to a user is executed.

The controller 200 of the mobile robot 1 may determine a suitability between the selected object and the plurality of zones of the indoor space at operation 1804. The controller 200 may determine a recommended location suitable for placing the object in the indoor space according to the suitability between the selected object and the plurality of zones. The controller 200 may display the determined recommended location on the environment map at operation 1805. The recommendation information including the recommended location of the object may be provided to the user through at least one of the mobile robot 1 or the user device 2.

The controller 200 of the mobile robot 1 may control the user device 2 to output a location movement notification, based on the object being placed in an arbitrary location different from the recommended location (or based on the object being placed in an arbitrary zone different from a recommended zone) at operations 1806 and 1807. The location movement notification may be provided through the user interface 60 or speaker 80 of the mobile robot 1.

The controller 200 of the mobile robot 1 may detect an event in which an environment of the recommended location changes after the object is placed at the recommended location at operations 1806 and 1808. The mobile robot 1 may notify the occurrence of the event regarding the environmental change in the recommended location through at least one of the user device 2, the user interface 60 of the mobile robot 1, or the speaker 80 of the mobile robot 1 at operation 1809. In response to the environmental change in the recommended location, the controller 200 may control an operation of at least one of the object placed, the mobile robot 1, or another device located around the recommended location at operation 1810.

According to an embodiment of the disclosure, a mobile robot may include: a communication circuitry configured to communicate with at least one of a user device or a server; a sensor configured to collect environmental information of an indoor space; and a controller configured to be electrically connected to the sensor and the communication circuitry. The controller may store the environmental information of each of a plurality of zones of the indoor space obtained by the sensor. The controller may set a purpose of a first zone of the plurality of zones, based on a user input or the environmental information of each of the plurality of zones. The controller may generate information recommending a target device to be placed in the first zone, based on environmental information of the first zone and required environmental information corresponding to the set purpose.

The controller may determine a suitability between the set purpose and the first zone, based on the required environmental information and the environmental information of the first zone, and determine the target device according to the suitability.

The controller may determine an optimal location of the target device in the first zone to optimize the suitability between the set purpose and the first zone, and generate the information further including the optimal location of the target device.

The controller may provide the user device with guide information to guide location movement of the target device, based on the target device being placed in an arbitrary location different from the optimal location in the first zone.

The controller may control an operation of the target device to allow the suitability to reach a predetermined optimal index, based on the target device being placed in the first zone.

The controller may identify an event where the environmental information of the first zone is changed after the suitability reaches the predetermined optimal index, and provide the user device with event information corresponding to the identified event.

The controller may generate the event information including abnormal operation information of the target device.

The controller may provide the user device with the event information, based on the event being identified in a state where a user is not present in the indoor space.

The environmental information of the first zone may include at least one environmental factor that determines an environment of the first zone, and an average or a median value of each of the at least one environmental factor. The controller may determine a reference value of each of the at least one environmental factor based on the required environmental information, and determine the suitability to be higher, as a difference between the reference value and the average or the median value of each of the at least one environmental factor is smaller.

The controller may determine an evaluation score for each of the at least one environmental factor, based on the difference between the reference value and the average or the median value of each of the at least one environmental factor, provide a weight, determined by the required environmental information, to the evaluation score for each of the at least one environmental factor, and determine the suitability by summing the evaluation scores of each of the at least one weighted environmental factor.

According to an embodiment of the disclosure, a method for controlling a mobile robot may include: collecting, by a sensor, environmental information of each of a plurality of zones of an indoor space; setting a purpose of a first zone of the plurality of zones, based on a user input or the environmental information of each of the plurality of zones; and generating information recommending a target device to be placed in the first zone, based on environmental information of the first zone and required environmental information corresponding to the set purpose.

The generating of the information may include determining a suitability between the set purpose and the first zone, based on the required environmental information and the environmental information of the first zone, and determining the target device according to the suitability.

The generating of the information may further include determining an optimal location of the target device in the first zone to optimize the suitability between the set purpose and the first zone.

The generating of the information may further include generating guide information to guide location movement of the target device, based on the target device being placed in an arbitrary location different from the optimal location in the first zone.

The method may further include controlling an operation of the target device to allow the suitability to reach a predetermined optimal index, based on the target device being placed in the first zone.

The method may further include identifying an event where the environmental information of the first zone is changed after the suitability reaches the predetermined optimal index, and providing the user device with event information corresponding to the identified event.

The event information may include abnormal operation information of the target device.

The event information may be provided to the user device, based on the event being identified in a state where a user is not present in the indoor space.

The environmental information of the first zone may include at least one environmental factor that determines an environment of the first zone, and an average or a median value of each of the at least one environmental factor. The determining of the suitability may include determining a reference value of each of the at least one environmental factor based on the required environmental information, and determining the suitability to be higher, as a difference between the reference value and the average or the median value of each of the at least one environmental factor is smaller.

The determining of the suitability may include determining an evaluation score for each of the at least one environmental factor, based on the difference between the reference value and the average or the median value of each of the at least one environmental factor, providing a weight, determined by the required environmental information, to the evaluation score for each of the at least one environmental factor, and determining the suitability by summing the evaluation scores of each of the at least one weighted environmental factor.

According to an embodiment of the disclosure, the server 3 may include a communication module configured to communicate with the mobile robot 1 and the user device 2, memory configured to store environmental information of each of a plurality of zones of an indoor space received from the mobile robot, and a processor configured to be electrically connected to the communication module and the memory. The processor may set a purpose of a first zone of the plurality of zones, based on the environmental information of each of the plurality of zones stored in the memory, and may generate information recommending a target device to be placed in the first zone, based on environmental information of the first zone and required environmental information corresponding to the set purpose.

The processor may transmit the information recommending the target device to be placed in the first zone, to the user device 2.

The processor may generate an environment map based on the environmental information of each of the plurality of zones.

The processor may determine a suitability between the set purpose and the first zone, based on the required environmental information and the environmental information of the first zone, and determine the target device according to the suitability.

The processor may determine an optimal location of the target device in the first zone to optimize the suitability between the set purpose and the first zone, and transmit the information including the optimal location to the user device.

The processor may obtain location information of the target device from the mobile robot, and may provide the user device with guide information to guide location movement of the target device, based on a location of the target device being different from the optimal location in the first zone according to the location information.

The processor may control an operation of the target device to allow the suitability to reach a predetermined optimal index, based on the location of the target device being placed in the first zone.

The processor may obtain, from the mobile robot, event information corresponding to an event where the environmental information of the first zone is changed, and may transmit the event information to the user device.

The processor may obtain location information of the user device, identify that a user is not present in the indoor space based on a location of the user device, and transmit the event information to the user device, based on the event information being received in a state where the user is not present in the indoor space.

The processor may determine at least one environmental factor that determines an environment of the first zone, and an average or a median value of each of the at least one environmental factor from the environmental information of each of the plurality of zones, determine a reference value of each of the at least one environmental factor based on the required environmental information, and determine the suitability to be higher, as a difference between the reference value and the average or the median value of each of the at least one environmental factor is smaller.

The processor may determine an evaluation score for each of the at least one environmental factor, based on the difference between the reference value and the average or the median value of each of the at least one environmental factor, may provide a weight, determined by the required environmental information, to the evaluation score for each of the at least one environmental factor, and may determine the suitability by summing the evaluation scores of each of the at least one weighted environmental factor.

As is apparent from the above, the mobile robot and the method for controlling the mobile robot according to the disclosure may provide an evaluation of an environment of each of a plurality of zones of an indoor space based on environmental information of the plurality of zones collected while traveling in the indoor space, thereby allowing a user to easily recognize an environment state of each of the plurality of zones.

The mobile robot and the method for controlling the mobile robot may recommend an electronic device required to use a specific zone of an indoor space for a user's desired purpose based on environmental information of the indoor space, thereby allowing a user to recognize how to improve an environment to use the specific zone for the user's desired purpose.

The mobile robot and the method for controlling the mobile robot may recommend a suitable location for an object that a user desires to place in an indoor space based on environmental information of the indoor space, thereby enhancing harmony between the object and the indoor space.

The disclosed embodiments may be implemented in the form of a recording medium that stores instructions executable by a computer. The instructions may be stored in the form of program codes, and when executed by a processor, the instructions may create a program module to perform operations of the disclosed embodiments.

The machine-readable recording medium may be provided in the form of a non-transitory storage medium. The term 'non-transitory storage medium' may mean a tangible device without including a signal (e.g., electromagnetic waves) and may not distinguish between storing data in the storage medium semi-permanently and temporarily. For example, the non-transitory storage medium may include a buffer that temporarily stores data.

The method according to the various embodiments of the disclosure may be provided in a computer program object. The computer program object may be a commercial object that may be traded between a seller and a buyer. The computer program object may be distributed in the form of a storage medium (e.g., compact disc read only memory (CD-ROM)), through an application store (e.g., Play Store™), directly between two user devices (e.g., smartphones), or online (e.g., downloaded or uploaded). In the case of online distribution, at least part of the computer program object (e.g., a downloadable app) may be at least temporarily stored or arbitrarily created in a storage medium that may be readable to a device, such as a server of the manufacturer, a server of the application store, or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A mobile robot comprising:
 a communication circuitry configured to communicate with at least one of a user device or a server;
 a sensor configured to collect environmental information of an indoor space;
 memory, comprising one or more storage media, storing instructions; and
 one or more processors electrically connected to the memory, the sensor, and the communication circuitry,
 wherein the instructions, when executed by the one or more processors, cause the mobile robot to:
 store the environmental information of each of a plurality of zones of the indoor space obtained by the sensor,
 set a purpose of a first zone of the plurality of zones, based on the environmental information of each of the plurality of zones,
 determine a reference value of each of at least one of environmental factor based on required environmental information corresponding to the purpose,
 determine a suitability between the set purpose and the first zone, based on comparing a representative value of each of the at least one environmental factor included in the environmental information of the first zone and the reference value,
 generate information recommending a target device to be placed in the first zone, based on the determined suitability, and
 control the communication circuitry to provide recommendation information to the user device for display,
 wherein the instructions, when executed by the one or more processors, further cause the mobile robot to:
 determine an evaluation score for each of the at least one environmental factor based on a difference value between the representative value and the reference value,
 provide a weight, determined by the required environmental information, to the evaluation score for each of the at least one environmental factor, and determine the suitability by summing the evaluation scores of each of the at least one weighted environmental factor, wherein the suitability is determined to be higher as the difference value between the representative value and the reference value of each of the at least one environmental factor becomes smaller.

2. The mobile robot of claim 1, wherein the instructions, when executed by the one or more processors, further cause the mobile robot to:

determine an optimal location of the target device in the first zone to optimize the suitability between the purpose and the first zone, and generate the information further including the optimal location of the target device.

3. The mobile robot of claim 2, wherein the instructions, when executed by the one or more processors, further cause the mobile robot to provide the user device with guide information to guide location movement of the target device, based on the target device being placed in a location different from the optimal location in the first zone.

4. The mobile robot of claim 1, wherein the instructions, when executed by the one or more processors, further cause the mobile robot to control an operation of the target device to allow the suitability to reach a predetermined optimal index, based on the target device being placed in the first zone.

5. The mobile robot of claim 4, wherein the instructions, when executed by the one or more processors, further cause the mobile robot to:

identify an event where the environmental information of the first zone is changed after the suitability reaches the predetermined optimal index, and provide the user device with event information corresponding to the identified event.

6. The mobile robot of claim 5, wherein the instructions, when executed by the one or more processors, further cause the mobile robot to generate the event information including abnormal operation information of the target device.

7. The mobile robot of claim 5, wherein the instructions, when executed by the one or more processors, further cause the mobile robot to provide the user device with the event information, based on the event being identified in a state where a user is not present in the indoor space.

8. A method performed by a mobile robot, the method comprising:

collecting, by a sensor, environmental information of each of a plurality of zones of an indoor space;

setting, by at least one computer processor of the mobile robot, a purpose of a first zone of the plurality of zones, based on the environmental information of each of the plurality of zones;

determining a reference value of each of at least one of environmental factor based on required environmental information corresponding to the purpose, determining a suitability between the set purpose and the first zone, based on comparing a representative value of each of the at least one environmental factor included in the environmental information of the first zone and the reference value;

generating, by the at least one computer processor, information recommending a target device to be placed in the first zone, based on the suitability; and controlling communication circuitry of the mobile robot to provide recommendation information to a user device for display, determining an evaluation score for each of the at least one environmental factor based on a difference value between the representative value and the reference value, providing a weight, determined by the required environmental information, to the evaluation score for each of the at least one environmental factor, and determining the suitability by summing the evaluation scores of each of the at least one weighted environmental factor, wherein the suitability is determined to be higher as the difference value between the representative value and the reference value of each of the at least one environmental factor becomes smaller.

9. The method of claim 8, wherein the generating of the information further comprises:

determining an optimal location of the target device in the first zone to optimize the suitability between the purpose and the first zone.

10. The method of claim 8, wherein the generating of the information further comprises:

generating guide information to guide location movement of the target device, based on the target device being placed in a location different from an optimal location in the first zone.

11. The method of claim 8, further comprising:

controlling an operation of the target device to allow the suitability to reach a predetermined optimal index, based on the target device being placed in the first zone.

12. The method of claim 11, further comprising:

identifying an event where the environmental information of the first zone is changed after the suitability reaches the predetermined optimal index; and providing the user device with event information corresponding to the identified event.

13. The method of claim 12, further comprising generating the event information including abnormal operation information of the target device.

14. The method of claim 12, further comprising providing the user device with the event information, based on the event being identified in a state where a user is not present in the indoor space.

15. One or more non-transitory computer-readable storage media storing computer-executable instructions that, when executed by one or more processors of a mobile robot, cause the mobile robot to perform operations, the operations comprising:

collecting, by a sensor, environmental information of each of a plurality of zones of an indoor space;

setting a purpose of a first zone of the plurality of zones, based on the environmental information of each of the plurality of zones;

determining a reference value of each of at least one of environmental factor based on required environmental information corresponding to the purpose, determining a suitability between the set purpose and the first zone, based on comparing a representative value of each of the at least one environmental factor included in the environmental information of the first zone and the reference value;

generating information recommending a target device to be placed in the first zone, based on the determined suitability; and displaying recommendation information on a user device, wherein the determining the suitability including;

determining an evaluation score for each of the at least one environmental factor based on a difference value between the representative value and the reference value;

providing a weight, determined by the required environmental information, to the evaluation score for each of the at least one environmental factor; and determining the suitability by summing the evaluation scores of each of the at least one weighted environmental factor, wherein the suitability is determined to be higher as the difference value between the representative value and the reference value of each of the at least one environmental factor becomes smaller.

\* \* \* \* \*